US010902618B2

(12) United States Patent
Payne et al.

(10) Patent No.: US 10,902,618 B2
(45) Date of Patent: Jan. 26, 2021

(54) UNIVERSAL BODY MOVEMENT TRANSLATION AND CHARACTER RENDERING SYSTEM

(71) Applicant: Electronic Arts Inc., Redwood City, CA (US)

(72) Inventors: Simon Payne, Guildford (GB); Darren Rudy, Burnaby (CA)

(73) Assignee: Electronic Arts Inc., Redwood City, CA (US)

(*) Notice: Subject to any disclaimer, the term of this patent is extended or adjusted under 35 U.S.C. 154(b) by 36 days.

(21) Appl. No.: 16/442,190

(22) Filed: Jun. 14, 2019

(65) Prior Publication Data
US 2020/0394806 A1 Dec. 17, 2020

(51) Int. Cl.
*G06T 13/40* (2011.01)
*G06T 7/246* (2017.01)
*G06T 19/20* (2011.01)

(52) U.S. Cl.
CPC .............. *G06T 7/251* (2017.01); *G06T 13/40* (2013.01); *G06T 19/20* (2013.01); *G06T 2219/2016* (2013.01)

(58) Field of Classification Search
CPC .......... G06F 17/11; G06F 30/20; G06T 13/20; G06T 2210/21; G06T 7/251; G06T 13/40; G06T 13/00; G06T 13/80; G06T 19/20; G06T 2219/2016; G06T 2200/16; G06N 3/006
See application file for complete search history.

(56) References Cited

U.S. PATENT DOCUMENTS

| 5,274,801 A | 12/1993 | Gordon |
| 5,548,798 A | 8/1996 | King |
| 5,982,389 A | 11/1999 | Guenter et al. |
| 5,999,195 A | 12/1999 | Santangeli |

(Continued)

FOREIGN PATENT DOCUMENTS

| CN | 102509272 A | 6/2012 |
| CN | 103546736 A | 1/2014 |

(Continued)

OTHER PUBLICATIONS

Anagnostopoulos et al., "Intelligent modification for the daltonization process", International Conference on Computer Vision Published in 2007 by Applied Computer Science Group of digitized paintings.

(Continued)

*Primary Examiner* — Ian L Lemieux
(74) *Attorney, Agent, or Firm* — Knobbe, Martens, Olson & Bear, LLP

(57) ABSTRACT

Systems and methods are disclosed for universal body movement translation and character rendering. Motion data from a source character can be translated and used to direct movement of a target character model in a way that respects the anatomical differences between the two characters. The movement of biomechanical parts in the source character can be converted into normalized values based on defined constraints associated with the source character, and those normalized values can be used to inform the animation of movement of biomechanical parts in a target character based on defined constraints associated with the target character.

20 Claims, 11 Drawing Sheets

(56) References Cited

U.S. PATENT DOCUMENTS

| | | | |
|---|---|---|---|
| 6,064,808 A | 5/2000 | Kapur et al. | |
| 6,088,040 A | 7/2000 | Oda et al. | |
| 6,253,193 B1 | 6/2001 | Ginter et al. | |
| 6,556,196 B1 | 4/2003 | Blanz et al. | |
| 6,961,060 B1 | 11/2005 | Mochizuki et al. | |
| 7,006,090 B2 | 2/2006 | Mittring | |
| 7,403,202 B1 | 7/2008 | Nash | |
| 7,415,152 B2 | 8/2008 | Jiang et al. | |
| 7,944,449 B2 * | 5/2011 | Petrovic | G06T 13/40 345/473 |
| 8,100,770 B2 | 1/2012 | Yamazaki et al. | |
| 8,142,282 B2 | 3/2012 | Canessa et al. | |
| 8,154,544 B1 | 4/2012 | Cameron et al. | |
| 8,207,971 B1 | 6/2012 | Koperwas et al. | |
| 8,267,764 B1 | 9/2012 | Aoki et al. | |
| 8,281,281 B1 | 10/2012 | Smyrl et al. | |
| 8,395,626 B2 | 3/2013 | Millman | |
| 8,398,476 B1 | 3/2013 | Sidhu et al. | |
| 8,406,528 B1 | 3/2013 | Hatwich | |
| 8,540,560 B2 | 9/2013 | Crowley et al. | |
| 8,599,206 B2 | 12/2013 | Hodgins et al. | |
| 8,624,904 B1 | 1/2014 | Koperwas et al. | |
| 8,648,863 B1 * | 2/2014 | Anderson | G06T 13/40 345/473 |
| 8,860,732 B2 | 10/2014 | Popovic et al. | |
| 8,914,251 B2 | 12/2014 | Ohta | |
| 9,117,134 B1 | 8/2015 | Geiss et al. | |
| 9,256,973 B2 | 2/2016 | Koperwas et al. | |
| 9,317,954 B2 | 4/2016 | Li et al. | |
| 9,483,860 B2 | 11/2016 | Hwang et al. | |
| 9,616,329 B2 | 4/2017 | Szufnara et al. | |
| 9,741,146 B1 | 8/2017 | Nishimura | |
| 9,811,716 B2 | 11/2017 | Kim et al. | |
| 9,826,898 B1 | 11/2017 | Jin et al. | |
| 9,858,700 B2 * | 1/2018 | Rose | G06T 13/40 |
| 9,947,123 B1 * | 4/2018 | Green | G06T 13/00 |
| 9,984,658 B2 | 5/2018 | Bonnier et al. | |
| 9,990,754 B1 | 6/2018 | Waterson et al. | |
| 10,022,628 B1 | 7/2018 | Matsumiya et al. | |
| 10,096,133 B1 | 10/2018 | Andreev | |
| 10,118,097 B2 | 11/2018 | Stevens | |
| 10,198,845 B1 | 2/2019 | Bhat et al. | |
| 10,388,053 B1 | 8/2019 | Carter, Jr. et al. | |
| 10,403,018 B1 | 9/2019 | Worsham | |
| 10,535,174 B1 | 1/2020 | Rigiroli et al. | |
| 10,726,611 B1 | 7/2020 | Court | |
| 10,733,765 B2 | 8/2020 | Andreev | |
| 10,755,466 B2 * | 8/2020 | Chamdani | G06F 3/017 |
| 2002/0054054 A1 | 5/2002 | Sanbe | |
| 2002/0089504 A1 * | 7/2002 | Merrick | G06F 3/0481 345/473 |
| 2002/0180739 A1 | 12/2002 | Reynolds et al. | |
| 2003/0038818 A1 | 2/2003 | Tidwell | |
| 2004/0027352 A1 * | 2/2004 | Minakuchi | G06T 13/40 345/473 |
| 2004/0227760 A1 | 11/2004 | Anderson et al. | |
| 2004/0227761 A1 | 11/2004 | Anderson et al. | |
| 2005/0237550 A1 | 10/2005 | Hu | |
| 2006/0036514 A1 | 2/2006 | Steelberg et al. | |
| 2006/0149516 A1 | 7/2006 | Bond et al. | |
| 2006/0217945 A1 * | 9/2006 | Leprevost | G06T 13/20 703/2 |
| 2006/0262114 A1 | 11/2006 | Leprevost | |
| 2007/0085851 A1 | 4/2007 | Muller et al. | |
| 2007/0097125 A1 | 5/2007 | Xie et al. | |
| 2008/0049015 A1 | 2/2008 | Elmieh et al. | |
| 2008/0111831 A1 | 5/2008 | Son et al. | |
| 2008/0152218 A1 | 6/2008 | Okada | |
| 2008/0268961 A1 | 10/2008 | Brook | |
| 2008/0316202 A1 | 12/2008 | Zhou et al. | |
| 2009/0066700 A1 | 3/2009 | Harding et al. | |
| 2009/0315839 A1 | 12/2009 | Wilson et al. | |
| 2010/0134501 A1 | 6/2010 | Lowe et al. | |
| 2010/0251185 A1 | 9/2010 | Pattenden | |
| 2010/0277497 A1 | 11/2010 | Dong et al. | |
| 2011/0012903 A1 | 1/2011 | Girard | |
| 2011/0074807 A1 | 3/2011 | Inada et al. | |
| 2011/0086702 A1 | 4/2011 | Borst et al. | |
| 2011/0119332 A1 | 5/2011 | Marshall et al. | |
| 2011/0128292 A1 | 6/2011 | Ghyme et al. | |
| 2011/0164831 A1 | 7/2011 | Van Reeth et al. | |
| 2011/0187731 A1 | 8/2011 | Tsuchida | |
| 2011/0269540 A1 | 11/2011 | Gillo et al. | |
| 2011/0292055 A1 | 12/2011 | Hodgins et al. | |
| 2012/0083330 A1 | 4/2012 | Ocko | |
| 2012/0115580 A1 | 5/2012 | Hornik et al. | |
| 2012/0220376 A1 | 8/2012 | Takayama et al. | |
| 2012/0244941 A1 | 9/2012 | Ostergren et al. | |
| 2012/0303343 A1 | 11/2012 | Sugiyama et al. | |
| 2012/0313931 A1 | 12/2012 | Matsuike et al. | |
| 2013/0050464 A1 | 2/2013 | Kang | |
| 2013/0063555 A1 | 3/2013 | Matsumoto et al. | |
| 2013/0120439 A1 | 5/2013 | Harris et al. | |
| 2013/0121618 A1 | 5/2013 | Yadav | |
| 2013/0222433 A1 | 8/2013 | Chapman et al. | |
| 2013/0235045 A1 | 9/2013 | Corazza et al. | |
| 2013/0263027 A1 | 10/2013 | Petschnigg et al. | |
| 2013/0311885 A1 | 11/2013 | Wang et al. | |
| 2014/0002463 A1 | 1/2014 | Kautzman et al. | |
| 2014/0198106 A1 | 7/2014 | Sumner et al. | |
| 2014/0198107 A1 | 7/2014 | Thomaszewski et al. | |
| 2014/0327694 A1 | 11/2014 | Cao et al. | |
| 2015/0113370 A1 | 4/2015 | Flider | |
| 2015/0126277 A1 | 5/2015 | Aoyagi | |
| 2015/0187113 A1 | 7/2015 | Rubin et al. | |
| 2015/0235351 A1 | 8/2015 | Mirbach et al. | |
| 2015/0243326 A1 | 8/2015 | Pacurariu et al. | |
| 2015/0381925 A1 | 12/2015 | Varanasi et al. | |
| 2016/0026926 A1 | 1/2016 | Yeung et al. | |
| 2016/0071470 A1 | 3/2016 | Kim et al. | |
| 2016/0217723 A1 | 7/2016 | Kim et al. | |
| 2016/0307369 A1 | 10/2016 | Freedman et al. | |
| 2016/0314617 A1 | 10/2016 | Forster et al. | |
| 2016/0354693 A1 | 12/2016 | Yan et al. | |
| 2017/0301310 A1 | 10/2017 | Bonnier et al. | |
| 2017/0301316 A1 | 10/2017 | Farell | |
| 2018/0122125 A1 | 5/2018 | Brewster | |
| 2018/0165864 A1 * | 6/2018 | Jin | G06F 3/011 |
| 2018/0211102 A1 | 7/2018 | Alsmadi | |

FOREIGN PATENT DOCUMENTS

| | | |
|---|---|---|
| CN | 105405380 A | 3/2016 |
| CN | 105825778 A | 8/2016 |

OTHER PUBLICATIONS

Andersson, S., Goransson, J.: Virtual Texturing with WebGL. Master's thesis, Chalmers University of Technology, Gothenburg, Sweden (2012).

Avenali, Adam, "Color Vision Deficiency and Video Games", The Savannah College of Art and Design, Mar. 2013.

Badlani et al., "A Novel Technique for Modification of Images for Deuteranopic Viewers", May 2016.

Belytschko et al., "Assumed strain stabilization of the eight node hexahedral element," Computer Methods in Applied Mechanics and Engineering, vol. 105(2), pp. 225-260 (1993), 36 pages.

Belytschko et al., Nonlinear Finite Elements for Continua and Structures, Second Edition, Wiley (Jan. 2014), 727 pages (uploaded in 3 parts).

Blanz V, Vetter T. A morphable model for the synthesis of 3D faces. In Proceedings of the 26th annual conference on Computer graphics and interactive techniques Jul. 1, 1999 (pp. 187-194). ACM Press/Addison-Wesley Publishing Co.

Blanz et al., "Reanimating Faces in Images and Video" Sep. 2003, vol. 22, No. 3, pp. 641-650, 10 pages.

Chao et al., "A Simple Geometric Model for Elastic Deformations", 2010, 6 pgs.

Cook et al., Concepts and Applications of Finite Element Analysis, 1989, Sections 6-11 through 6-14.

(56) References Cited

OTHER PUBLICATIONS

Cournoyer et al., "Massive Crowd on Assassin's Creed Unity: AI Recycling," Mar. 2, 2015, 55 pages.
Dick et al., "A Hexahedral Multigrid Approach for Simulating Cuts in Deformable Objects", IEEE Transactions on Visualization and Computer Graphics, vol. X, No. X, Jul. 2010, 16 pgs.
Diziol et al., "Robust Real-Time Deformation of Incompressible Surface Meshes", to appear in Proceedings of the 2011 ACM SIGGRAPH/Eurographics Symposium on Computer Animation (2011), 10 pgs.
Dudash, Bryan. "Skinned instancing." NVidia white paper(2007).
Fikkan, Eirik. Incremental loading of terrain textures. MS thesis. Institutt for datateknikk og informasjonsvitenskap, 2013.
Geijtenbeek, T. et al., "Interactive Character Animation using Simulated Physics", Games and Virtual Worlds, Utrecht University, The Netherlands, The Eurographics Association 2011, 23 pgs.
Georgii et al., "Corotated Finite Elements Made Fast and Stable", Workshop in Virtual Reality Interaction and Physical Simulation VRIPHYS (2008), 9 pgs.
Halder et al., "Image Color Transformation for Deuteranopia Patients using Daltonization", IOSR Journal of VLSI and Signal Processing (IOSR-JVSP) vol. 5, Issue 5, Ver. I (Sep.-Oct. 2015), pp. 15-20.
Han et al., "On-line Real-time Physics-based Predictive Motion Control with Balance Recovery," Eurographics, vol. 33(2), 2014, 10 pages.
Hernandez, Benjamin, et al. "Simulating and visualizing real-time crowds on GPU clusters." Computación y Sistemas 18.4 (2014): 651-664.
Hu G, Chan CH, Yan F, Christmas W, Kittler J. Robust face recognition by an albedo based 3D morphable model. In Biometrics (IJCB), 2014 IEEE International Joint Conference on Sep. 29, 2014 (pp. 1-8). IEEE.
Hu Gousheng, Face Analysis using 3D Morphable Models, Ph.D. Thesis, University of Surrey, Apr. 2015, pp. 1-112.
Irving et al., "Invertible Finite Elements for Robust Simulation of Large Deformation", Eurographics/ACM SIGGRAPH Symposium on Computer Animation (2004), 11 pgs.
Kaufmann et al., "Flexible Simulation of Deformable Models Using Discontinuous Galerkin FEM", Oct. 1, 2008, 20 pgs.
Kavan et al., "Skinning with Dual Quaternions", 2007, 8 pgs.
Kim et al., "Long Range Attachments—A Method to Simulate Inextensible Clothing in Computer Games", Eurographics/ACM SIGGRAPH Symposium on Computer Animation (2012), 6 pgs.
Klein, Joseph. Rendering Textures Up Close in a 3D Environment Using Adaptive Micro-Texturing. Diss. Mills College, 2012.
Komura et al., "Animating reactive motion using momentum-based inverse kinematics," Computer Animation and Virtual Worlds, vol. 16, pp. 213-223, 2005, 11 pages.
Lee, Y. et al., "Motion Fields for Interactive Character Animation", University of Washington, Bungie, Adobe Systems, 8 pgs, obtained Mar. 20, 2015.
Levine, S. et al., "Continuous Character Control with Low-Dimensional Embeddings", Stanford University, University of Washington, 10 pgs, obtained Mar. 20, 2015.
Macklin et al., "Position Based Fluids", to appear in ACM TOG 32(4), 2013, 5 pgs.
Mcadams et al., "Efficient Elasticity for Character Skinning with Contact and Collisions", 2011, 11 pgs.
McDonnell, Rachel, et al. "Clone attack! perception of crowd variety." ACM Transactions on Graphics (TOG). vol. 27. No. 3. ACM, 2008.
Muller et al., "Meshless Deformations Based on Shape Matching", SIGGRAPH 2005, 29 pgs.
Muller et al., "Adding Physics to Animated Characters with Oriented Particles", Workshop on Virtual Reality Interaction and Physical Simulation VRIPHYS (2011), 10 pgs.
Muller et al., "Real Time Dynamic Fracture with Columetric Approximate Convex Decompositions", ACM Transactions of Graphics, Jul. 2013, 11 pgs.
Muller et al., "Position Based Dymanics", VRIPHYS 2006, Oct. 21, 2014, Computer Graphics, Korea University, 23 pgs.
Musse, Soraia Raupp, and Daniel Thalmann. "Hierarchical model for real time simulation of virtual human crowds." IEEE Transactions on Visualization and Computer Graphics 7.2 (2001): 152-164.
Nguyen et al., "Adaptive Dynamics With Hybrid Response," 2012, 4 pages.
O'Brien et al., "Graphical Modeling and Animation of Brittle Fracture", GVU Center and College of Computing, Georgia Institute of Technology, Reprinted from the Proceedings of ACM SIGGRAPH 99, 10 pgs, dated 1999.
Orin et al., "Centroidal dynamics of a humanoid robot," Auton Robot, vol. 35, pp. 161-176, 2013, 18 pages.
Parker et al., "Real-Time Deformation and Fracture in a Game Environment", Eurographics/ACM SIGGRAPH Symposium on Computer Animation (2009), 12 pgs.
Pelechano, Nuria, Jan M. Allbeck, and Norman I. Badler. "Controlling individual agents in high-density crowd simulation." Proceedings of the 2007 ACM SIGGRAPH/Eurographics symposium on Computer animation. Eurographics Association, 2007. APA.
Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.
Ruiz, Sergio, et al. "Reducing memory requirements for diverse animated crowds." Proceedings of Motion on Games. ACM, 2013.
Rungjiratananon et al., "Elastic Rod Simulation by Chain Shape Matching with Twisting Effect" SIGGRAPH Asia 2010, Seoul, South Korea, Dec. 15-18, 2010, ISBN 978-1-4503-0439-9/10/0012, 2 pgs.
Seo et al., "Compression and Direct Manipulation of Complex Blendshape Models", Dec. 2011, in 10 pgs.
Sifakis, Eftychios D., "FEM Simulations of 3D Deformable Solids: A Practioner's Guide to Theory, Discretization and Model Reduction. Part One: The Classical FEM Method and Discretization Methodology", SIGGRAPH 2012 Course, Version 1.0 [Jul. 10, 2012], 50 pgs.
Stomakhin et al., "Energetically Consistent Invertible Elasticity", Eurographics/ACM SIGGRAPH Symposium on Computer Animation (2012), 9 pgs.
Thalmann, Daniel, and Soraia Raupp Musse. "Crowd rendering." Crowd Simulation. Springer London, 2013. 195-227.
Thalmann, Daniel, and Soraia Raupp Musse. "Modeling of Populations." Crowd Simulation. Springer London, 2013. 31-80.
Treuille, A. et al., "Near-optimal Character Animation with Continuous Control", University of Washington, 2007, 7 pgs.
Ulicny, Branislav, and Daniel Thalmann. "Crowd simulation for interactive virtual environments and VR training systems." Computer Animation and Simulation 2001 (2001 ): 163-170.
Vaillant et al., "Implicit Skinning: Real-Time Skin Deformation with Contact Modeling", (2013) ACM Transactions on Graphics, vol. 32 (n° 4). pp. 1-11. ISSN 0730-0301, 12 pgs.
Vigueras, Guillermo, et al. "A distributed visualization system for crowd simulations." Integrated Computer-Aided Engineering 18.4 (2011 ): 349-363.
Wu et al., "Goal-Directed Stepping with Momentum Control," Eurographics/ ACM SIGGRAPH Symposium on Computer Animation, 2010, 6 pages.

* cited by examiner

UNIVERSAL BODY MOVEMENT TRANSLATION AND CHARACTER RENDERING SYSTEM

FIELD OF THE DISCLOSURE

The described technology generally relates to computer technology and, more specifically, to animation.

BACKGROUND

Modern video games often include characters and creatures that have detailed, lifelike movement and animation. This is often implemented through a computationally expensive animation process, through which a 3D model is animated using a complex script. Generally, the 3D model must be manipulated through the entire range of motion captured in the animation. As an example, in order to animate a human character running, a video game modeler may have to utilize software to create a 3D model of the character's body and then separately adjust the pose of the model for each frame in the run animation. In other words, the video game modeler may have to manually adjust a pose of the character model for each step defined in the run animation. Additionally, once the moving animation is scripted, the animation may only be suitably applied to that particular character model since translating that movement to an entirely different model having different features, dimensions, and extremities may not be possible, may yield unusual results, or more result in the loss of data and fidelity of animation. Thus, hard-coding the moving animation for a character is a process that can result in a large amount of work which is not transferable between characters and creatures, requiring that the distinct animations of each character or creature to be created separately.

Accordingly, there exists a need to be able to transfer or translate motion data (e.g., for an animation) between different character or creature models, and even across different projects, video games, and companies. This would greatly reduce the time and cost associated with developing modern video games. Embodiments of the present disclosure address these issues and more.

SUMMARY OF THE DISCLOSURE

Described herein are systems and methods for universal body movement translation and character rendering, such that motion data from a source character can be translated and used to direct movement of a target character model in a way that respects the anatomical differences between the two characters.

This can be done by having a universal language, set of rules, or protocol, for describing the movement (e.g., rotational and translation positioning) of the different biomechanical parts (e.g., moving joints/parts) in the anatomies of animated, three-dimensional character models. While reference is made herein to video games, the techniques described can apply to any scenario in which animated, three-dimensional character models are used, such as films, TV shows, and so on.

As will be described, a three-dimensional character model can be defined for a character of a certain creature type. The various biomechanical parts of the three-dimensional character model may have specifically defined constraints, which can include ranges of motion and neutral positioning, that are associated with that character. The biomechanical parts of the three-dimensional character model can be arranged into different poses (e.g., adjustments from a neutral positioning of that part) and an expression or movement animation may be thought of as a series of full-body poses that are stitched together, with each full-body pose made up of the many poses of the different biomechanical parts.

A pose for a biomechanical part may be converted into a singular action code that indicates the adjustment (e.g., rotational and translational positioning) of the part in all six axes of freedom, normalized for the constraints that are specific to that character. Thus, a complex, full-body pose of a three-dimensional character model to be represented based on a collection of action codes, which represent the combination of adjustments made to the various biomechanical parts of the model to arrive at that full-body pose. As an example, an animator may desire a first biomechanical part of a three-dimensional character model to be in a certain pose and can specify a first action code for adjusting the first biomechanical part of the model. The animator may want a second biomechanical part of the three-dimensional character model to be in certain pose at the same time, and may therefore combine the first action code with a second action code indicating positioning of the second biomechanical part. In this way, the animator can easily generate complex, full-body poses for a character model.

In other words, an animator can simply specify combinations of action codes to cause generation of a full-body pose of the three-dimensional character model. Alternatively, the animator may be able to move around and adjust the parts of the three-dimensional character model until the desired full-body pose is obtained, and the combination of action codes associated with that full-body pose may be generated. Furthermore, an animation can be thought of as a sequence of full-body poses that are stitched together, which is represented by a series of different collections of action codes.

Thus, the action codes serve as a universal language for describing the movement and positioning of the biomechanical parts in a three-dimensional character model, and animators can rapidly create full-body poses and animations for any particular three-dimensional character model via a combinations of action codes. Combinations of these action codes can generate complex poses and animation that are not possible in prior systems.

An example standard or protocol utilized to define the format of these action codes is described herein, but any other standard can be selected and falls within the scope of this disclosure. These action codes may be applied universally to any three-dimensional character model, including different character models of the same or different type of creatures. However, the action codes may be evaluated in a manner that respects the different constraints and anatomical differences associated with each character. In other words, an animator may take a first action code for a first biomechanical part and similarly specify the action code for other target character models.

These target character models will then express the same pose for their first biomechanical part, subject to any relative adjustments made for the constraints or anatomical differences associated with each target character, such as restrictions on the full range of motion for that first biomechanical part. Therefore, the techniques described herein enable an animator to rapidly specify full-body poses used in expressions (e.g., movement animations) via combinations of action codes, even when the characters have different body dimensions (e.g., both a first character and a second character are human beings, but the first character may have longer limbs).

Additionally, while an animator can specify similar action code(s) for each character, the actual resulting poses or expressions of the 3D character model that are generated for each character may be configured to be distinct, if desired. For example, a second character may have a slightly different walking animation than a first character despite using similar action codes due to the second character's biomechanical parts having different restrictions on the full range of motion (e.g., the second character may have a different gait, possibly due to an injury that restricted the range of motion of the second character's legs).

As will be described, these subtle variations may be informed via defined constraints for each character that can be stored in a table or database, as well as offsets that can be defined in a relationship table or database, thus ensuring that different lifelike characters can be realistically animated. Therefore, each character may optionally have unique movement characteristics that can be layered on top of the universal language.

In this way, the techniques described herein allow animators to utilize transferable action codes (which may include a common set of reference codes for fundamental biomechanical parts shared by different characters and/or animals) to create full-body poses and expressions for any character. In contrast to other example systems in which the animators may be required to uniquely adjust the individual 3D models of different characters, frame-by-frame, in order to generate movement animations, an animator may instead rely on the common set of action codes to translate movement animation.

The systems and methods described herein therefore improve the functioning of the computer and address technological problems. In contrast to prior systems, which may rely on individually adjusting a separate 3D model for every character, frame-by-frame, to create unique motion animation for a required scenario, the rules-based approach described herein allows animators to bring realistic uniformity to each character while providing flexibility, speed, and efficiency which has not been possible.

For example, prior systems may require an animator to uniquely arrange a 3D character model into a full-body pose for each frame of a movement animation. Therefore, a character will have only a small defined set of full-body poses which have been rendered. Any modification to the movement animation or the 3D model itself may require significant additional work by the animator. In contrast, the rules-based approach described herein utilizes action codes to describe hundreds, or thousands, and so on, different poses. Additionally, since the rules-based approach relies on a common set of defined biomechanical parts across different characters/animals for the action codes, animators can rapidly specify combinations of action codes for any character.

Furthermore, since expressions and complex animation can be generated from sets of action codes referencing fundamental biomechanical parts, less storage space may be required to animate scenes on a resulting video game. For example, a video game may store pre-rendered animation for a character that was rendered using sets of action codes. Or, the a video game system executing the video game may generate and render an animation for a character during runtime of the video game based on sets of action codes. Thus, for video games that utilize full, lifelike, animations for its characters, the techniques described herein can allow for reductions in storage space.

Various aspects of the novel systems, apparatuses, and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to any systems and/or devices that could benefit from universal facial expression. The detailed description and drawings are merely illustrative of the disclosure rather than limiting, the scope of the disclosure being defined by the appended claims and equivalents thereof.

In various embodiments, systems and/or computer systems are disclosed that comprise computer readable storage media having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising computer readable storage media are disclosed, wherein the computer readable storage media have program instructions embodied therewith, the program instructions executable by one or more processors to cause the one or more processors to perform operations comprising one or more aspects of the above- and/or below-described embodiments (including one or more aspects of the appended claims).

In some embodiments, a computer-implemented method is contemplated that includes obtaining motion data for a source character; determining, from the motion data, motion of a source biomechanical part of the source character; determining one or more constraints for the source biomechanical part, including a first range of motion defined for the source biomechanical part and the source character; generating, based on the one or more constraints for the source biomechanical part, an action code representative of the motion of the source biomechanical part; determining, for a target character, a target biomechanical part that corresponds to the source biomechanical part; determining one or more constraints for the target biomechanical part, including a second range of motion defined for the target biomechanical part and the target character; evaluating, based on the one or more constraints for the target biomechanical part, the action code to determine relative motion of the target biomechanical part; and applying the relative motion of the target biomechanical part to a three-dimensional model of the target character. In various embodiments, the method may further include determining one or more offsets associated with the source character and the target character; and prior to evaluating the action code, applying the one or more offsets to the action code.

In some embodiments, a non-transitory computer storage media is contemplated that stores instructions that when executed by a system of one or more computers, cause the one or more computers to perform operations that include: obtaining motion data for a source character; determining, from the motion data, motion of a source biomechanical part of the source character; determining one or more constraints for the source biomechanical part, including a first range of motion defined for the source biomechanical part and the source character; generating, based on the one or more constraints for the source biomechanical part, an action code representative of the motion of the source biomechanical part; determining, for a target character, a target biomechanical part that corresponds to the source biomechanical part; determining one or more constraints for the target biomechanical part, including a second range of motion defined for the target biomechanical part and the target character; evaluating, based on the one or more constraints for the target biomechanical part, the action code to determine relative motion of the target biomechanical part; and applying the relative motion of the target biomechanical part to a three-dimensional model of the target character. In various embodiments, the instructions may further cause the one or more computers to perform operations including: determining one or more offsets associated with the source character and the target character; and prior to evaluating the action code, applying the one or more offsets to the action code.

In some embodiments, a system is contemplated that includes one or more computers and computer storage media storing instructions that when executed by the one or more computers, cause the one or more computers to perform operations including: obtaining motion data for a source character; determining, from the motion data, motion of a source biomechanical part of the source character; determining one or more constraints for the source biomechanical part, including a first range of motion defined for the source biomechanical part and the source character; generating, based on the one or more constraints for the source biomechanical part, an action code representative of the motion of the source biomechanical part; determining, for a target character, a target biomechanical part that corresponds to the source biomechanical part; determining one or more constraints for the target biomechanical part, including a second range of motion defined for the target biomechanical part and the target character; evaluating, based on the one or more constraints for the target biomechanical part, the action code to determine relative motion of the target biomechanical part; and applying the relative motion of the target biomechanical part to a three-dimensional model of the target character.

In various embodiments, the one or more offsets associated with the source character and the target character are stored in a configuration associated with motion translation between the source character and the target character. In various embodiments, the motion of the source biomechanical part includes at least one of: a rotation around the X-axis, a rotation around the Y-axis, a rotation around the Z-axis, a translation in the X-axis, a translation in the Y-axis, and a translation in the Z-axis. In various embodiments, the first range of motion defined for the source biomechanical part and the source character is a range for one of: a rotation around the X-axis, a rotation around the Y-axis, or a rotation around the Z-axis. In various embodiments, the second range of motion defined for the target biomechanical part and the target character is a range for one of: a rotation around the X-axis, a rotation around the Y-axis, or a rotation around the Z-axis. In various embodiments, the action code includes a serial identifying the source biomechanical part. In various embodiments, the action code represents the motion of the source biomechanical part for each of: a rotation around the X-axis, a rotation around the Y-axis, a rotation around the Z-axis, a translation in the X-axis, a translation in the Y-axis, and a translation in the Z-axis. In various embodiments, generating the action code may include normalizing the motion of the source biomechanical part using the one or more constraints for the source biomechanical part and a normalization scheme. In various embodiments, the normalization scheme includes a range of values between −10 and 10.

BRIEF DESCRIPTION OF THE DRAWINGS

The following drawings and the associated description herein are provided to illustrate specific embodiments of the disclosure and are not intended to be limiting.

DETAILED DESCRIPTION

Figure 1:
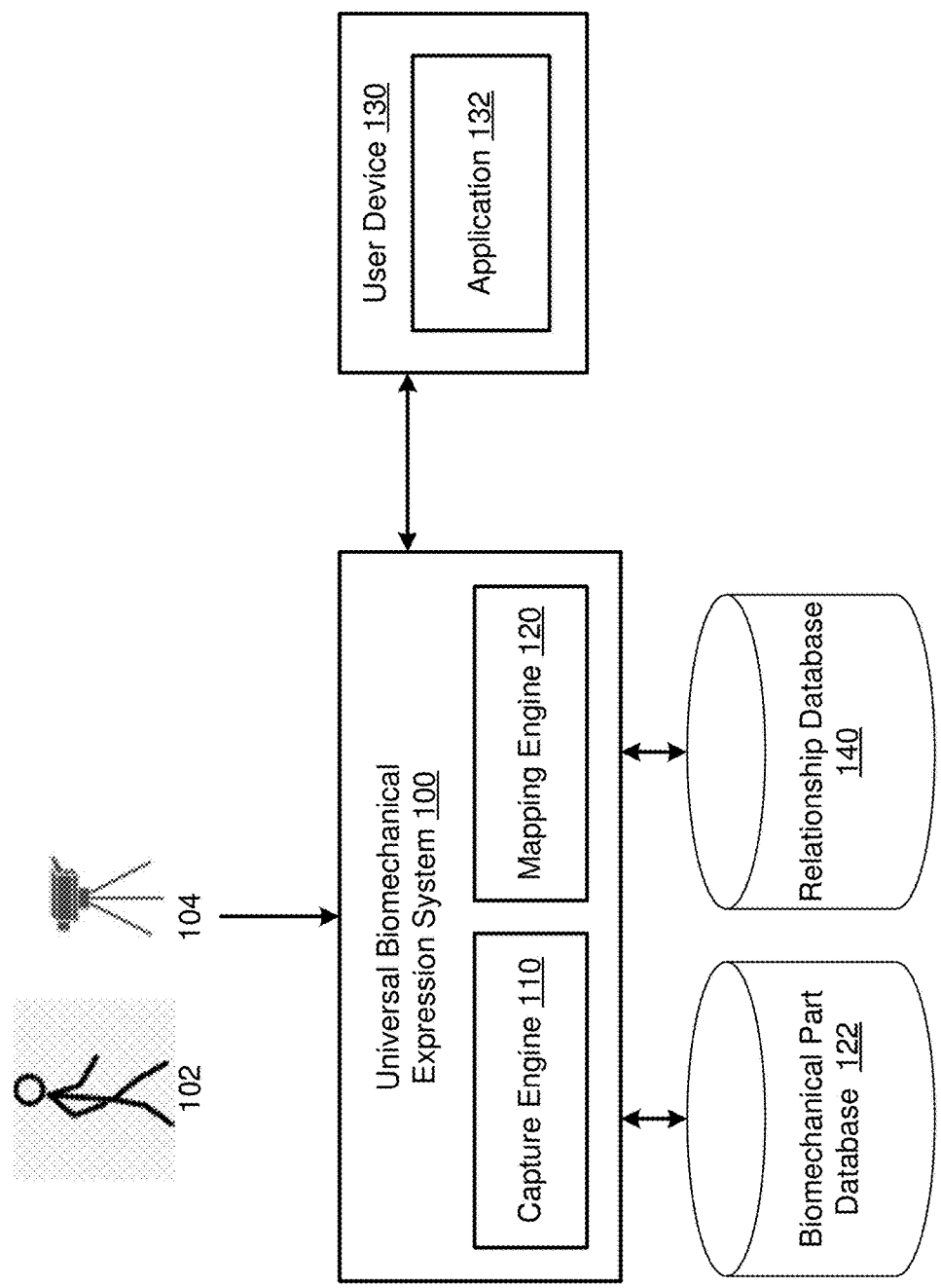
FIG. 1 illustrates a block diagram of an example universal biomechanical expression system.

This specification describes systems and methods for utilizing universal languages for action codes, that can be used to specify poses, full-body poses, and expressions (e.g., animation) that can be applied to three-dimensional character models of different animated characters (e.g., animated characters in video games, films, and so on). For example, an animator can specify a particular collection of action codes according to a universal language, and different animated character models can automatically update to present the particular pose associated with those action codes. A series of these collections of action codes can be used in sequence in order to obtain expressions and more complex animation. Furthermore, these universal action codes may allow complex animation for a target character to be quickly generated based on motion data associated with a source character, by translating the motion data into action codes that can be then applied to the target character.

As will be described, each animated character may have a distinct version of specified poses. As an example, each character may have a unique restrictions on the full range of motion of its biomechanical parts, such that the specified pose will be adjusted based on those different parameters. As another example, each animated character may have a unique body shape (e.g., they may be associated with different types of animals), such as different numbers of limbs, different limb lengths or designs, and so forth. These differences may result in each animated character having a distinct version of a specific pose. Adjustments to the poses may be made in order to express these differences, resulting in lifelike, and unique looking, animated characters.

In order to facilitate an understanding of the systems and methods discussed herein, a number of terms are described below. The terms described below, as well as other terms used herein, should be construed broadly to include the provided definitions, the ordinary and customary meaning of the terms, and/or any other implied meaning for the respective terms.

As used herein, a three dimensional character model, also referred to as a three-dimensional character model, a three-dimensional model, or a character model, can refer to a wire-frame mesh, or point-cloud, model of a body, with textures (e.g., blended textures) on the model representative of the body. For example, images of a person (e.g., an actor) may be obtained via a camera rig. These images can be utilized to generate a point-cloud of the person's body, in which points with location and depth information are connected via vertices. A modeler (e.g., a blend-shape artist) can modify the point-cloud, blend textures, and so on, to generate a three-dimensional character model based on the person's body. The character model can be divided into a plurality of sections or portions that are associated with the various biomechanical parts in the anatomy associated with the character model (e.g., the skeletal system of the underlying creature). In some embodiments, each biomechanical part may be associated with a serial number. In some embodiments, each biomechanical part may be associated with a neutral pose (e.g., based on a neutral position within each of the six axes of freedom). The biomechanical parts may be adjusted relative to the neutral pose to conform to each of a multitude of poses defined by the action codes.

As used herein, a biomechanical part may be any moving part in an animal, such as a joint, a bone, cartilage, muscle tissue, and so forth. In some instances, there may be analogous biomechanical parts between different animals, though they do not necessarily have to have the same structure and/or function. For example, many birds and mammals have necks that provide the head additional rotational flexibility. The neck in each of these animals may be considered to be analogous biomechanical parts. However, fish do not have necks, but rather a series of bones that connect their skull to the shoulder girdle. Those series of bones could be either considered to be analogous or not analogous to a neck. These relationships between biomechanical parts of different animals may be defined within a relationship table and used to facilitate the mapping of movement animations between different animals. In some embodiments, analogous biomechanical parts across different animals may be assigned the same serial number reference code.

As used herein, a range of motion may include a range of rotation or range of translation for a biomechanical part of a character in a given axis of movement. The range of motion may be described in absolute terms (e.g., Euler units or degrees for the range of rotation).

A range of rotation may be associated with a specific minimum and a specific maximum, which may refer to the rotational limits for a joint or body part, in a particular axis of rotation, of a particular character or creature. For example, owls are well known to be able to horizontally rotate their heads (e.g., around the Y-axis) up to 270 degrees either left or right in order to see over their shoulder. If the neutral pose associated with the owl is looking straight ahead, then a designated neutral position within the available range of rotation in the Y-axis can defined as the zero degree position. The owl rotating its head fully to the left to look behind it may be considered the −270 degree position and the owl rotating its head fully to the right to look behind it may be considered the +270 degree position. Under this reference system, the −270 degree position (e.g., a full leftward rotation) may be considered the specific minimum and the 270 degree position (e.g., a full rightward rotation) may be considered the specific maximum associated with the full range of rotation around the Y-axis for the owl's head. (However, it should be noted that under an alternate reference system, the directions may be swapped, such that the −270 degree position may be associated with a full rightward rotation and a 270 degree position may be associated with a full leftward rotation. Either is acceptable, as long as the orientation of the reference system remains consistent across different animals).

In some embodiments, the full range of motion for a joint or body part, in a particular axis, for a specific character or animal, can be used to normalize motion data and generate action codes that can be applied across different character or animals. Any suitable numerical, unit-less range may be used for the normalization, such as −1 to 1, 0 to 10, and so forth. For instance, in some embodiments, positions within the range of motion for a joint or body part may be normalized and expressed based on a range of −1 to 1, such that −1 is associated with the specific minimum of the range of motion and 1 is associated with the specific maximum of the range of motion. When this normalized range is applied to the owl in the previous example, which is capable of rotating its head around the Y-axis up to 270 degrees to the left or right, a normalized value of −1 may be associated with a full leftward rotation (e.g., the −270 degree position) and a normalized value of 1 may be associated with a full rightward rotation (e.g., the +270 degree position). However, in comparison to an owl, a human being may only be capable of rotating their head around the Y-axis up to 90 degrees to the left or right. Thus, when the same normalization scheme is applied to the full range of motion of the human being, a normalized value of −1 may be associated with a full leftward rotation (e.g., the −90 degree position) and a normalized value of 1 may be associated with a full rightward rotation (e.g., +90 degree position). This normalization may allow animation data to be meaningfully transferred between animals. In some embodiments, the full range of motion for each joint or body part, in each particular axis, may be pre-defined for different characters and creatures. Those values may be stored in a table or database in order to enable the translation of normalized values.

As used herein, the normalized position of a biomechanical part may refer to the position of a particular biomechanical part once it is normalized (e.g., made unitless) against the full range of motion for that biomechanical part and character in a particular axis, based on the chosen normalization scheme. This normalized position may referred to as an action unit, and an action code may include a set of action units describing the normalized position of a biomechanical in each axis of freedom. As an example, the chosen scale for normalization may be between −10 to 10, such that −10 corresponds to the specific minimum of the full range of rotation and 10 corresponds to the specific maximum of the full range of rotation. An owl, which is capable of rotating its head around the z-axis up to 270 degrees to the left or right, may have its head in the rotational position of −135 degrees (e.g., halfway towards the full leftward rotation). The normalized rotational position may be considered −5 in the normalized scale (e.g., −135/−270=X/−10, solving for X).

As used herein, an action serial or serial number may be a reference code or identifier used to reference a particular biomechanical part (e.g., a joint or body part, or the corresponding analogous joint or body part) across different animals. For instance, all recognized biomechanical parts may be indexed and given a serial number that serves as a reference code. As a more specific example, consider the left knee joint in humans and primates (e.g., the joint between the femur, tibia, and patella) may correspond to the stifle joint in the left hind leg of quadrupeds such as dogs, horses, and mice (e.g., the joint between the femur, tibia, and patella). The same reference code (e.g., the number 033) may be used to refer to the joint across the different animals. Some animals may have unique biomechanical parts with their own reference codes.

As used herein, an action code may be an identifier that informs of the relative positioning of a particular biomechanical part within its full range of motion for each axis of freedom (e.g., at a singular point in time). The action code may include a set of action units, with each action unit describing the relative positioning of a particular biomechanical part within its full range of motion for a specific axis of freedom. In some embodiments, an action code may be a unified action code, which includes an action serial or reference code associated with a particular biomechanical part. Action codes are described in further detail in regards to FIG. 3.

As used herein, a pose may be associated with its ordinary meaning as it pertains to a biomechanical part (e.g., a joint or body part), but it may also be associated with an adjustment of the biomechanical part from a neutral position or the relative positioning of a particular biomechanical part (e.g., a joint or body part) at a singular point in time. A pose for a biomechanical part may be captured and described using an action code.

As used herein, a full-body pose may be associated with its ordinary meaning as it pertains to one or more biomechanical parts, up to all of the biomechanical parts within a character model. In some embodiments, a full-body pose may be associated with the adjustments of the biomechanical parts from their neutral position or the relative positioning of the biomechanical parts at a singular point in time. Thus, a full-body pose may be captured and described using a collection of action codes, one for each biomechanical part associated with movement.

As used herein, an expression or movement animation may be associated with a series of full-body poses captured over time (e.g., frames within a movement animation). In some embodiments, an expression may be communicated as a series of different collections of action codes. If each collection of action codes is used to render a full-body pose that serves as a frame in the movement animation, the various full-body poses can be stitched together in sequence to create the movement animation. Additional interpolation can also be used to smooth out the animation.

As used herein, a biomechanical parts table or database may be used to define the constraints associated with the biomechanical parts of a particular character or creature. For example, this reference may list the full range of motion of each biomechanical part, in each axis, for each creature and/or character. This may further enable movement animations to be translated between different characters, since motion data can be normalized against the different full ranges of motion specified for the biomechanical parts of each character. For example, an owl may be able to horizontally rotate their heads (e.g., around the Y-axis) up to 270 degrees either left or right in order to see over their shoulder. Thus, this reference may include this defined full range of motion on the Y-axis for the neck for owls. A human being may be able to horizontally rotate their heads (e.g., around the Y-axis) up to 90 degrees either left or right. This reference may include this defined full range of motion around the Y-axis for the neck of human beings. The use of this information is described in regards to FIGS. 8, 9, and 10.

As used herein, a relationship table or database may map out the relationships between biomechanical parts of different characters or creatures when translating motion between characters or creatures. Information in the relationship table or database can be also be included a configuration associated with two different characters or creatures to facilitate the translation of motion between those two different characters or creatures. In some embodiments, the relationship table or database may list a mapping of biomechanical parts between creatures or characters. This may enable motion data to be translated between characters or creatures by having the movement for a biomechanical part in a first creature be translated into movement for a specific biomechanical part of a second creature. In some embodiments, the relationship table may also list offsets that may be applied when translating motion data between two different characters or creatures.

As used herein in reference to user interactions with data displayed by a computing system, "user input" is a broad term that refers to any type of input provided by a user that is intended to be received and/or stored by the system, to cause an update to data that is displayed by the system, and/or to cause an update to the way that data is displayed by the system. Non-limiting examples of such user input include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand and/or a 3D mouse.

As used herein, a data store can refer to any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

As used herein, a database can refer to any data structure (and/or combinations of multiple data structures) for storing and/or organizing data, including, but not limited to, relational databases (e.g., Oracle databases, mySQL databases, and so on), non-relational databases (e.g., NoSQL databases, and so on), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Example Universal Biomechanical Expression System

With regards to the figures, FIG. 1 illustrates a block diagram of an example universal biomechanical expression system 100. The universal biomechanical expression system 100 can be a system of one or more computers, one or more virtual machines executing on a system of one or more computers, and so on. As described above, the universal biomechanical expression system 100 may be able to store and analyze motion data associated with a three-dimensional character model.

The three-dimensional character model can be generated in multiple ways and any suitable method will do. For example, in order to initially generate a three-dimensional character model for a character, in some cases, an animator may rely on full-body images or scans of a subject (e.g., a real-life person or animal). For example, one or more cameras may be used to capture images of the entire body of the subject from different angles. Optionally, depth sensors (e.g., e.g., lidar, infrared points being projected onto the body, stereo cameras, and so on) may be utilized to obtain accurate depth information of the subject's body. While these images are being captured, the actor may be requested to make poses with portions (e.g., biomechanical parts) of their body. The system can obtain the captured images and generate a photogrammetric model of the subject's body (e.g., a point cloud of the subject's body, such as points connected via vertices).

The photogrammetric model can be used to generate a three-dimensional character model that will be imported into a video game. The three-dimensional model can include textures for the subject's body, and preserve a portion of the vertices included in the point cloud. The three-dimensional character model may be further optimized for processing and storage constraints. The generated three-dimensional model may be have biomechanical parts in neutral (e.g., resting) positions, from which the positions of the biomechanical parts may be adjusted. The biomechanical parts of the three-dimensional character model may also be adjusted and manipulated using action codes. Different characters may have different neutral positions for their biomechanical parts and an action code may inform of how a particular biomechanical part should be adjusted from the neutral position of that biomechanical part, relative to the full range of motion of the biomechanical part for the character. Furthermore, additional offsets or differences may be applied to adjust the biomechanical part for that character. These little variations serve to tie the poses and expressions of the character model to a realistic, lifelike character (e.g., person or animal). In some cases, images can be used to help render the biomechanical parts of the character model in different poses. For example, a character model with its different poses (including all the biomechanical parts in their neutral positions) may be stored in one or more databases. With respect to each biomechanical part of a character, a range can be defined for its permitted movement along with a neutral position within that range. For example, the maximum limit that a head can be turned left or right on the Y-axis can be provided, along with the neutral position within that range (e.g., the resting position may be looking straight ahead).

Motion data (e.g., for a complex animation) for a three-dimensional character model can also be generated in multiple ways. An animator may be able to manipulate the biomechanical parts of the three-dimensional character model by hand for each frame of a complex animation, or the animator may be able to provide a combination of action codes for each frame that is used to adjust the biomechanical parts of the three-dimensional character model. For human characters where motion capture is a possibility, motion capture can be used to capture movement from a human actor that can be converted to motion data applicable to the three-dimensional character model. This motion data can then be translated and used by the universal biomechanical expression system 100 to drive the animation of a different three-dimensional character model.

Thus, in some embodiments, the universal biomechanical expression system 100 may include a camera 104, as illustrated, taking images or video of an actor 102. While the example includes one camera 104, it should be understood that multitudes of cameras can be utilized. For example, the cameras may be included in a camera rig, with each camera capturing a high-resolution iposemage of a specific portion of the actor's 102 body. Additionally, two or more cameras may capture a same portion of the actor's 102 body, but taken at different angles (e.g., stereo cameras). In this way, depth information can be obtained. Various images may be captured and utilized to generate a more complete three-dimensional model of the actor. The camera 104 may also be used to capture movement from the actor 102 that can be applied to a three-dimensional character model.

The universal biomechanical expression system 100 includes a capture engine 110 that can receive the images captured by the camera(s) 104 and generate a three-dimensional character model. For example, a user of the user device 130 can generate a three-dimensional model of the actor's 102 body. To generate this three-dimensional model, the capture engine 110 can combine (e.g., stitch together) images of the actor's body, and generate a point cloud of the body. For example, the point cloud can include multitudes of points defining depth associated with the actor's 102 body at a respective location. This point cloud can therefore represent an accurate model of a topology of the actor's 102 body. The capture engine 110 can output the point cloud, for example for presentation on the user device 130, and the user can generate a three-dimensional model of a character based on the point cloud.

As illustrated, the universal biomechanical expression system 100 is in communication with a user device 130 of a user (e.g., a modeler, an animator, and so on). The user device 130 can be a desktop computer system, a laptop, a tablet, a mobile device, a wearable computer, and so on. Optionally, the universal biomechanical expression system 100 may be connected (e.g., a wireless or wired connection) to a display, and a user can directly utilize the universal biomechanical expression system 100. Optionally, the universal biomechanical expression system 100 may implement a web application which the user device 130 can access. That is, the user device 130 can present a web page or a user interface associated with an application 132 executing on the user device 130 (e.g., an 'app' obtained from an electronic application store, a web application, and so on). The universal biomechanical expression system 100 can then provide information to the user device 130 for inclusion in the web page or application 132. For example, the user can provide user interactions, such as a combination of action codes, to the user device 130, and the universal biomechanical expression system 100 can receive these user interactions and generate an output associated with them (e.g., a resulting pose from a combination of action codes).

In some embodiments, the universal biomechanical expression system 100 may able to take the captured images or motion capture data of an actor's body during movement (e.g., as frames of a movement animation or full-body poses associated with the three-dimensional character model) and convert it into raw motion data (e.g., the positions of each biomechanical part in the model) associated with the three-dimensional character model. In some embodiments, the universal biomechanical expression system 100 may be able to take motion data for a first character model and then translate it to action codes that can be applied to animate a second character model. As a practical outcome, this may effectively enable the movement of the second character model to mimic the motion data captured from the actor 102 that was applied to a first character model.

In order to do this translation, the universal biomechanical expression system 100 may have a mapping engine 120 that is configured to consult a biomechanical part database 122. The biomechanical part database 122 may include a serial number or reference code associated with each biomechanical part of every character, as well as constraints associated with those biomechanical parts. The constraints may include the full range of motion of each biomechanical part, in each axis, for each creature and/or character. The constraints may also include the designated neutral positions of each biomechanical part, in each axis, for each creature and/or character. In order to generate an action code associated with motion data for a biomechanical part of a source character, the universal biomechanical expression system 100 may consult the biomechanical part database 122 to determine the serial number and the constraints associated with that biomechanical part of the character. That information can be used to normalize the motion data and generate the action code. In some embodiments, the biomechanical part database 122 may organize information in an object-oriented manner, such that default constraints and serial numbers associated with biomechanical parts are defined for different creatures. The biomechanical part database 122 may also include any modified constraints associated with a specific character within each of those creature types, but in the absence of any constraints that is particularly defined for that specific character, the constraints associated with the overall creature type may be used. For example, the biomechanical part database 122 may define a range of rotation in the Y-axis for the head of human beings to be 90 degrees. There may be two human characters, Jack and Jill, which are also listed within the biomechanical part database 122. Jack has the additional constraint, which is that the range of rotation in the Y-axis for his head is only 70 degrees. In this scenario, the mapping engine 120 may use the range of 70 degrees for evaluating action codes associated with Jack, while using the range of 90 degrees applied to humans overall for evaluating action codes associated with Jill.

The mapping engine 120 may also be configured to consult a relationship database 140. The relationship database 140 may serve to map out the relationships between biomechanical parts of different characters or creatures when translating motion between those characters or creatures. This relationship information may include serial numbers for corresponding biomechanical parts between two characters or creatures, how the different axes of freedom may be mapped between those biomechanical parts, and also any offset values that need to be applied to the action units of the action code when translating motion between the two characters or creatures (in either direction). For instance, if motion data for a right upper leg joint is being translated from a human being to a spider, then the relationship database 140 can be consulted to determine the relationship between humans and spiders with the serial number of the right upper leg joint, and it may list the serial number(s) of the corresponding biomechanical parts within a spider anatomy, how the action unit input values for the human right upper leg joint should be mapped to different axes of those corresponding biomechanical parts (e.g., rotations in the X-axis of the human right upper leg joint should correspond to rotations in the Y-axis of a corresponding biomechanical part in the spider), and any offset values that need to be additionally applied to the action unit input values. In some embodiments, the relationship database 140 may organize information in an object-oriented manner, such that information is defined and organized by different pairs of creatures. The relationship database 140 may also include any particular modifications associated with translations for specific characters within each of those creature types, but in the absence of that information, the relationship information associated with the overall pair of creatures may be used. For example, the relationship database 140 may define overall relationship data for translating motion between humans and spiders. However, there may be two separate spider characters, Spider A and Spider B. Spider A may have additional relationship information, such as a different set of offsets to apply when translating motion data from humans to Spider A. In this scenario, the mapping engine 120 may use the offsets specific to Spider A when translating motion data to Spider A, while using the overall spider offsets when translating motion data for Spider B.

Examples of Translating Motion Animation between Humanoids

Figure 2:
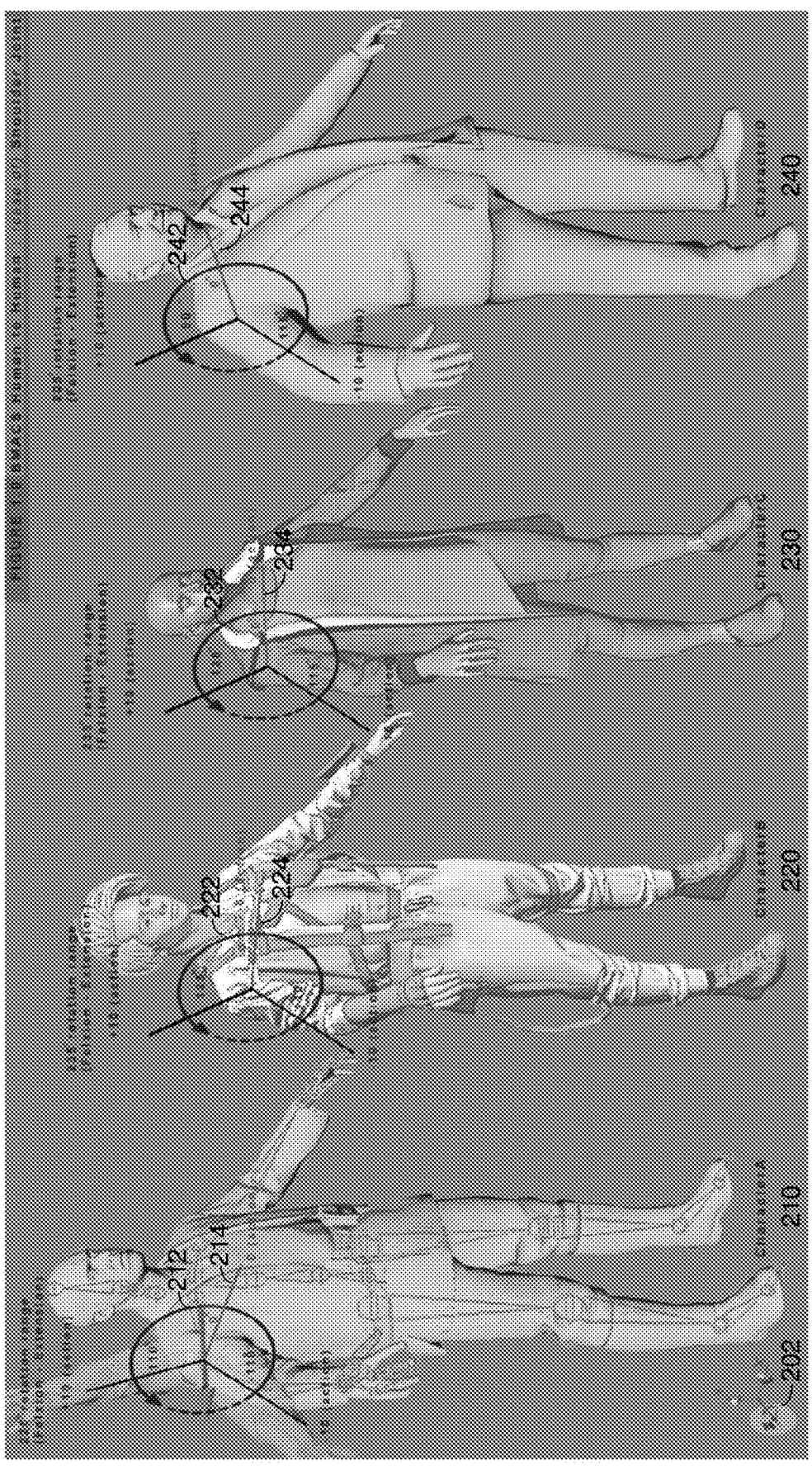
FIG. 2 illustrates an example of how a motion animation can be translated from a human character to a different human character, in accordance with embodiments of the present disclosure.

FIG. 2 illustrates an example of how a motion animation can be translated from a human character to a different human character. More specifically, four different human characters are shown in FIG. 2, including Character A 210, Character B 220, Character C 230, and Character D 240. A three-dimensional reference axes 202 is also shown in the lower left hand corner and the following description is written with the reference axes 202 in mind.

For any common biomechanical part, each different character may have a distinct full range of movement (e.g., rotation or translation) and designated neutral position for each of the six axes of freedom. For the purpose of facilitating understanding of this concept, the full range of rotation around the Z-axis for the right shoulder of all four human characters is shown.

This full range of rotation may be described in absolute terms (e.g., in Euler units or degrees). The designated neutral position (also referred to as the neutral pose) of rotation around the Z-axis for the right shoulder is also shown for all four human characters. The designated neutral position may serve as a reference point (e.g., the 0 degree position) within the full range of rotation, which divides the corresponding full range of rotation into a positive range (e.g., from zero to a specific maximum) and a negative range (e.g., from zero to a specific minimum). Based on this convention, the rotational position of the right shoulder can be described as a positive or negative number of degrees, and any rotation of the right shoulder can be described as a positive rotation (e.g., towards the positive range) or a negative rotation (e.g., towards the negative range). The biomechanical terms of flexion and extension may also be used to refer to these rotational directions.

For instance, FIG. 2 shows the right shoulder of Character A 210 having a 220 degree full range of rotation 212 around the Z-axis with a designated neutral position 214 at the midpoint of the full range of rotation 212. This divides the full range of rotation 212 into a positive range from 0 degrees to 110 degrees (e.g., the specific maximum) and a negative range from 0 degrees to negative 110 degrees (e.g., the specific minimum).

These rotational ranges are subject to the physical limits associated with Character A 210 and represent available movement in the flexion/extension rotational Z-axis of this character's right shoulder joint. For example, if Character A 210 had an injury at the time of performance, or the animation made for this character suggested an injury, it would result in affected movement. This would be reflected in the rotational ranges associated with Character A 210. When translating motion between two characters, the motion (e.g., a series of rotational positions) can be translated from a first character to a second character based on the defined rotational ranges for both characters (e.g., by re-factoring the ranges using a normalization scheme), which allows these idiosyncrasies and the underlying nature-of-movement to be preserved. This re-factorization process respects the relative differences in physical nature between two or more characters and produces a different translation result compared to retargeting, in which motion data (e.g., rotational positions) is simply applied from one character to another in absolute terms (e.g., in Euler units or degrees) using an approximated pose-match.

The right shoulder of Character B 220 is shown having a 235 degree full range of rotation 222 around the Z-axis, with a designated neutral position 224 that separates the full range of rotation 222 into a positive range from 0 degrees to 125 degrees (e.g., the specific maximum) and a negative range from 0 degrees to -110 degrees (e.g., the specific minimum).

The right shoulder of Character C 230 is shown also having a 235 degree full range of rotation 232 around the Z-axis, with a designated neutral position 234 that separates the full range of rotation 232 into a positive range from 0 degrees to 120 degrees (e.g., the specific maximum) and a negative range from 0 degrees to -115 degrees (e.g., the specific minimum). Thus, the designated neutral position 234 of Character C 230 is different from the designated neutral position 224 of Character B 220 despite both characters having similar, 235 degree full ranges of rotation.

Finally, the right shoulder of Character D 240 is shown having a 205 degree full range of rotation 242 around the Z-axis, with a designated neutral position 244 that separates the full range of rotation 242 into a positive range from 0 degrees to 90 degrees (e.g., the specific maximum) and a negative range from 0 degrees to -115 degrees (e.g., the specific minimum).

Thus, it can be seen from FIG. 2, that for just the Z-axis of rotation for the right shoulder alone, there may be a distinct full range of rotation and designated neutral position that is defined for each different character. This is a simplistic example, as each character may have a full range of movement and designated neutral position defined for each axes of freedom of not only the right shoulder, but every other biomechanical part as well.

Furthermore, it should be noted that the designated neutral position does not necessarily have to divide a full range of rotation into two equal ranges in both the positive and negative directions. The ratio between the positive range and the negative range may vary depending on the designated neutral position relative to the full range of movement for that movement axis, which may change based on the character and the creature's anatomical structure. For instance, even though the designated neutral position 214 for Character A 210 divides the full range of rotation 212 into two equal movement ranges (resulting in a 1:1 ratio between the positive and negative ranges), the other characters depicted in FIG. 2 have different ratios between the positive and negative ranges.

In order to make it easier to animate the movement of character models and translate movement between different characters, the full range of motion for a biomechanical part can be described using rescaled, normalized values instead. Any suitable normalization scheme may be used. For instance, normalized values between -1 and 1 can be used, with -1 corresponding to the specific minimum of the range of motion, 1 corresponding to the specific maximum of the range of motion, and 0 corresponding to the designated neutral position. However, these values can be factorized to make them easier to work with, such as factorizing the previous normalized range by 10 (e.g., 0-10 is a more animation-friendly unit range than 0-1), or a different normalization scheme can be chosen altogether.

In an example normalization scheme where the rotational position can be described using normalized values between -10 to 10, a normalized rotational value of 10 would correspond the rotational position at the specific maximum, a normalized rotational value of -10 would correspond to the rotational position at the specific minimum, and a normalized rotational value of 0 would correspond to the designated neutral position. Thus, for Character A 210, a normalized rotational value of 10 for the right shoulder around the Z-axis would correspond to a rotational position of +110 degrees (e.g., Character A 210 has their right upper arm lifted as high as possible), whereas a normalized rotational value of 5 would correspond to a rotational position of +55 degrees (e.g., 110/2) for Character A 210. This same normalized rotational value of 5 would correspond to a rotational position of +45 degrees (e.g., 90/2) for Character D 240, whose anatomy and physical condition results in a shorter range of rotation than that of Character A 210 (e.g., Character D 240 has a full range of rotation 242 with a more-restricted positive range that spans from 0 to 90 degrees).

Thus, by using a normalization scheme that factors in the range of movement of each character, the description-of-movement on one character can be expressed relative to the description-of-movement of another character. Movement for a first character can be translated into movement for a second character by first normalizing, based on the first character's defined range of motion, the motion data for the first character that is in absolute terms, and then de-normalizing against the second character's defined range of motion. Using the previous example, if motion data for Character A 210 indicated that the right shoulder is at a rotational position of +55 degrees relative to the designated neutral position 214, that would correspond to a normalized rotational value of 5. When this normalized rotational value is applied to Character D 240, it can be de-normalized against the defined full range of rotation 242 for Character D 240 (e.g., (5/10)*(the positive range of motion)), which results in a rotational position of +45 degrees relative to the designated neutral position 244 for Character D 240. This overall process is summarized in the flow charts of FIGS. 8 and 9.

To make the translation of movement between characters faster and more efficient, motion data can also be expressed as a series of unified action codes. The unified action code may be configured to indicate a specific biomechanical part and any normalized values associated with each of the six axes of freedom (such as the relative rotational positioning of the biomechanical part within the available full range of rotation for a particular axis of rotation).

Example Protocol for Unified Action Code

Figure 3:
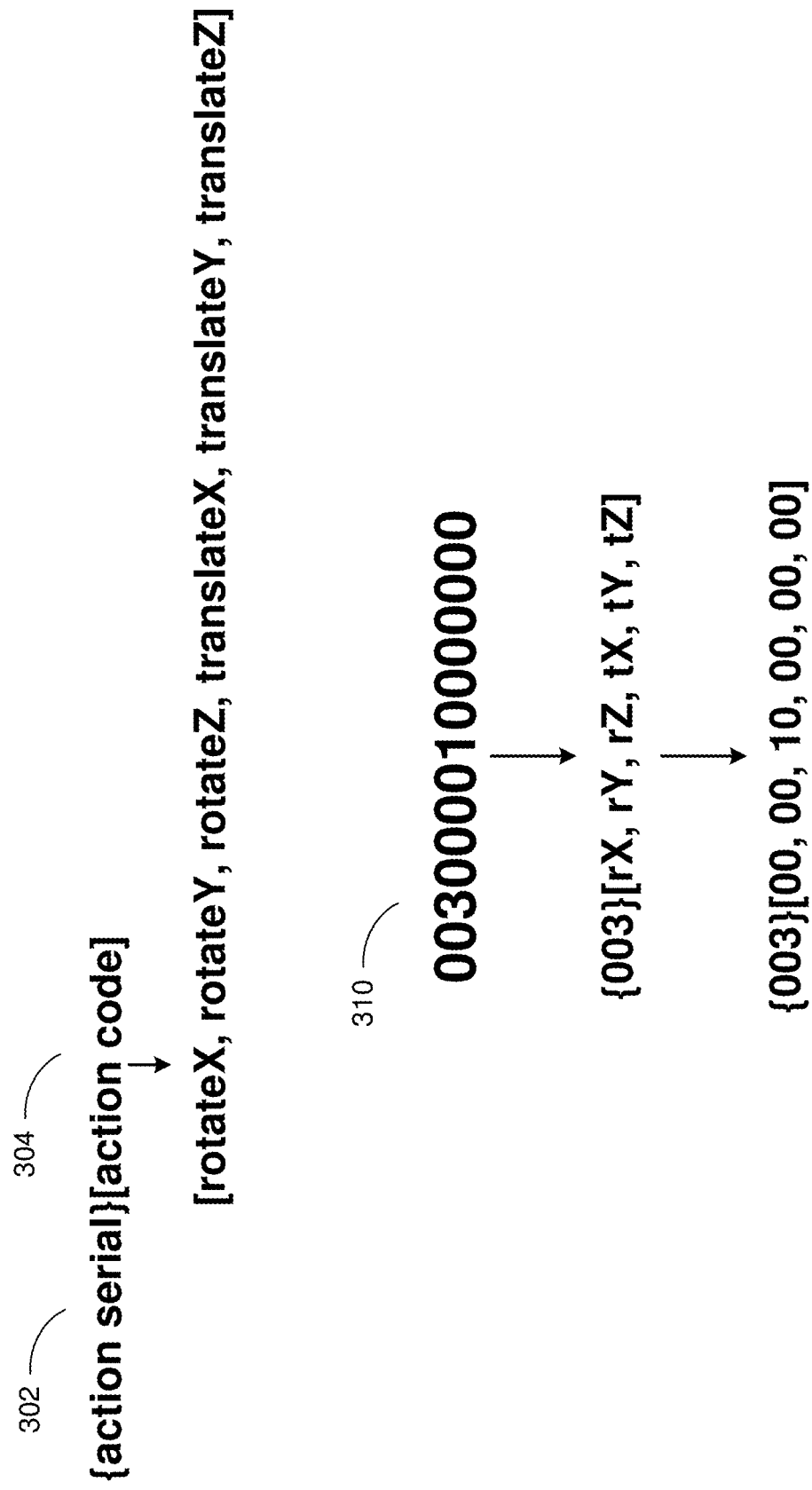
FIG. 3 illustrates an example protocol for a unified action code, in accordance with embodiments of the present disclosure.

FIG. 3 illustrates an example protocol for a unified action code. Under this example protocol, a unified action code may include two parts, an action serial 302 and an action code 304. The action serial 302 may be a serial number (e.g., a three digit number) that is arbitrarily assigned to a particular biomechanical part (which may be common across different characters and/or creatures) and used to reference that biomechanical part. For example, each of the four characters shown in FIG. 2 has a right shoulder joint, which may be associated with a serial number of 003.

The action code 304 may be a value set used to represent relative positioning of the referenced biomechanical part within the character's range-of-motion for each of the six axes of freedom. For instance, under a normalization scheme that represents a full range of motion using values from −10 to +10, the action code 304 may include corresponding inputs for each of the three rotational axes and three translation axes, in the form xyz (e.g., [rotateX, rotateY, rotateZ, translateX, translateY, translateZ]). Each input may have a padding of two zeroes for a double digit factor range of −10 to 10 (with 00 being the designated neutral position). Thus, a value set of "000000000000" would be associated with the default positions for all axes.

Thus, the example unified action code 310 ("003000010000000") can be interpreted as having an action serial of "003" for the right shoulder joint and an action code of "000010000000", which can be broken down into the corresponding inputs of [00, 00, 10, 00, 00, 00] for [rX, rY, rZ, tX, tY, tZ]. The normalized rotational value of +10 corresponding to the rotational Z-axis indicates that this example unified action code 310 is associated with a maximum positive angle for right shoulder joint flexion/extension rotation around the Z-axis (e.g., the specific maximum of the available full range of rotation).

If this example unified action code 310 were associated with Character A 210 in FIG. 2, for instance, who has a right shoulder joint with a 220 degree full range of rotation around the Z-axis and a designated neutral position that divides this full range of rotation into an equal positive range (0 degrees to +110 degrees) and negative range (0 degrees to −110 degrees), then the example unified action code 310 would correspond with a rotational positioning of +110 degrees relative to the designated neutral position.

Example of Motion Translation Between Humanoid and Non-Humanoid

Figure 4:
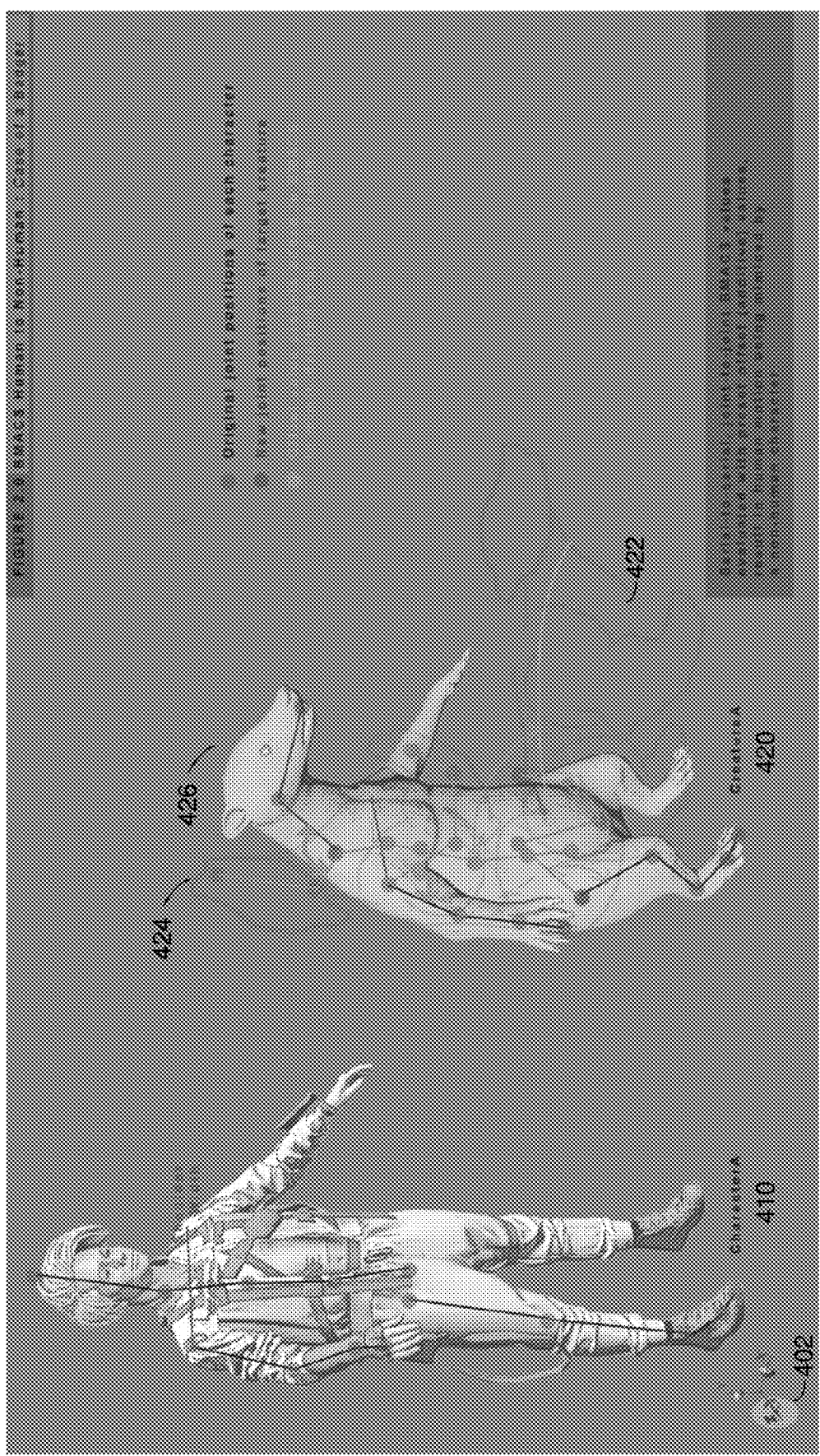
FIG. 4 illustrates an example of how a motion animation can be translated from a humanoid character to a non-humanoid character having a similar body structure, in accordance with embodiments of the present disclosure.

FIG. 4 illustrates an example of how a motion animation can be translated from a humanoid character to a non-humanoid character having a similar body structure (like-for-like). More specifically, a human Character A 410 is shown alongside a badger Character B 420, but this specific example of translating human-to-badger motion can be more generally applied to translate motion from a human character to a non-human character (e.g., a different creature). A three-dimensional reference axes 402 is also shown in the lower left hand corner and the following description is written with the reference axes 402 in mind.

One use case for translating motion from a human character to a non-human character is to allow motion data for the human character (e.g., captured from a human actor) to be used for driving animation of the non-human character, which can save money and time. Since the universal biomechanical expression system described herein translates motion between two characters based on the defined ranges of motion specific to those two characters (e.g., respecting the relative differences in physical nature between the two characters), the results may be considerably different from the standard practice of retargeting, in which motion data (e.g., rotational positions) is simply applied from one character to another in absolute terms (e.g., in Euler units or degrees) using an approximated pose-match.

However, in some embodiments, the universal biomechanical expression system may not necessarily have the capabilities for making logical assumptions (e.g., without additional human guidance) about how types of movement for a first type of creature can be used to drive a like-movement on a second type of creature. In such embodiments, the universal biomechanical expression system may be configured to handle movement data rather than deciding which types of movement to use. Thus, if motion data for a walking human Character A 410 is used to drive arm and leg movement of the badger Character B 420 (e.g., using the process described in regards to FIG. 2), the badger Character B 420 may not be expected to walk "like a human" because the biomechanical systems of a badger produces a very different nature of movement for a walk as compared to that of a human walk.

The biomechanical systems of a badger may result in a badger's 'neutral' pose (ready to move, no specific-use movement within the pose yet) looking like the ghosted outline 422 shown in FIG. 4. The hind legs are perpendicular to the body, the front legs/arms are perpendicular to the chest, and paws are at about 75 degrees, pressed against the ground. The spine and head are parallel to the ground. If the universal biomechanical expression system used motion data for human arms and legs to drive movement for a badger (e.g., using the process described in regards to FIG. 2 and without any additional changes), it would result in the front legs of the badger swinging backwards and forwards. Although the movement of the hind legs of the badger would have some similarities to the desired motion, it would only vaguely resemble it. None of the paws would correctly contact the ground and the body of the badger might wave slightly, pivoting from the pelvis.

In order to make correct use of human animation on a badger (e.g., translate motion data from a human character to a badger character), the badger should "mimic" the human being. In order to achieve this, the universal biomechanical expression system may be able to apply offset values or multipliers to action unit input values (e.g., the normalized values for rotational or translational position) in order to represent the anatomical differences between one creature and another. It is important to note that the offset values may need to affect both positions of target joints and rotations. In other words, the normalized values obtained in the translation process described in regards to FIG. 2 for serial-to-serial, joint-to-joint motion mapping can be additionally evaluated with preset offsets (e.g., additive values) to enable human motion to be mimicked by a non-human character. This cannot be done with traditional retargeting technology, which can only be performed on a like-for-like character/creature basis (e.g., biped-to-biped, quadruped-to-quadruped only).

FIG. 4 illustrates this by providing an example of offsets being evaluated on top of action unit values (e.g., the normalized values for rotational or translational position). For instance, offsets can be applied to the action units associated with the hip and base of the spine for a human Character A 410, resulting in Euler values on those joints belonging to the badger Character B 420. The badger Character B 420 now stands upright due to the offsets. The ghosted outline 424 in this position depicts the unaffected head now pointing directly upwards, rather than forward-facing. In order to achieve the depicted badger pose 426, the head and neck joints will also receive applied offsets. Furthermore, there may be additional parts of the badger (possibly all of the badger) that can receive offsets in order to mimic a human-like base pose. All the offsets used may be recorded as a configuration for translating motion for a human to a badger. The final resulting movement animation for the badger would not vaguely resemble a walking badger, but rather a badger walking like a human. This mimicking nature is not possible with standard retargeting methods.

Example of Motion Translation Between Different Body Structures

Figure 5:
FIG. 5 illustrates an example of how a motion animation can be translated from a humanoid character to a non-humanoid character having a different body structure, in accordance with embodiments of the present disclosure.

FIG. 5 illustrates an example of how a motion animation can be translated from a human character to a non-human character having a different body structure. More specifically, a human Character A 510 is shown alongside a spider Character B 520, but this specific example of translating human-to-spider motion can be more generally applied to translate motion from a human character to a non-human character (e.g., a different creature). A three-dimensional reference axes 502 is also shown in the lower left hand corner and the following description is written with the reference axes 502 in mind.

FIG. 5 is meant to show a more extreme example compared to FIG. 4, for how motion data can be translated between a human character and a non-human character, even with wildly different body structures (and wildly different animation rigs). For instance, the leg joints of the human Character A 510 may be used to drive the legs of the spider Character B 520. This may involve switching effective axes between characters or creatures, either through the use of offsets or by exchanging serials between the source and the target.

For example, it may be possible to use the human hip and base of the spine with an offset in order to animate the body of the spider via serializing the thorax of the spider to that of the human pelvis. The legs of the spider would then inherit the human leg animation, also via offsets.

Alternatively, an effective re-wiring of the spider's data inputs can be used to switch the Y and Z rotation channels. In other words, motion data associated with the rotation of a human's upper leg in the rotational Y-axis can be used to drive rotation of the spider's leg in the rotational Z-axis, and motion data associated with the rotation of a human's upper leg in the rotational Z-axis can be used to drive rotation of the spider's leg in the rotational Y-axis. This will cause the illustrated leg 522 to rotate in the axis expected of a spider leg, proportionally to the rotation of the human upper leg 512. Each subsequent leg joint of the spider will similarly require offsets, and perhaps match the tarsus action serial to that of a human toe, and metatarsus to that of a human foot. Furthermore, a time based offset or standard value offset could be used to drive the other three legs on the left and three legs on the right of the spider Character B 520. These settings can be tweaked and recorded in a reusable configuration, which can allow for a spider walking based off of human animation. This spider walking animation, although it is more than a mimic of how a human walks (due to major differences in biomechanical structure), may not necessarily appear natural or correct to the motion of a real spider. However, it may serve as a great place to start rather than having to animate a spider model from scratch. Furthermore, for the purposes of in-game swarms of small spiders or small creatures on-screen, this rough walking animation may actually be enough as is, and therefore be very cheap or free animation at volume.

Example of Motion Translation Between Non-Humanoid Body Structures

Figure 6:
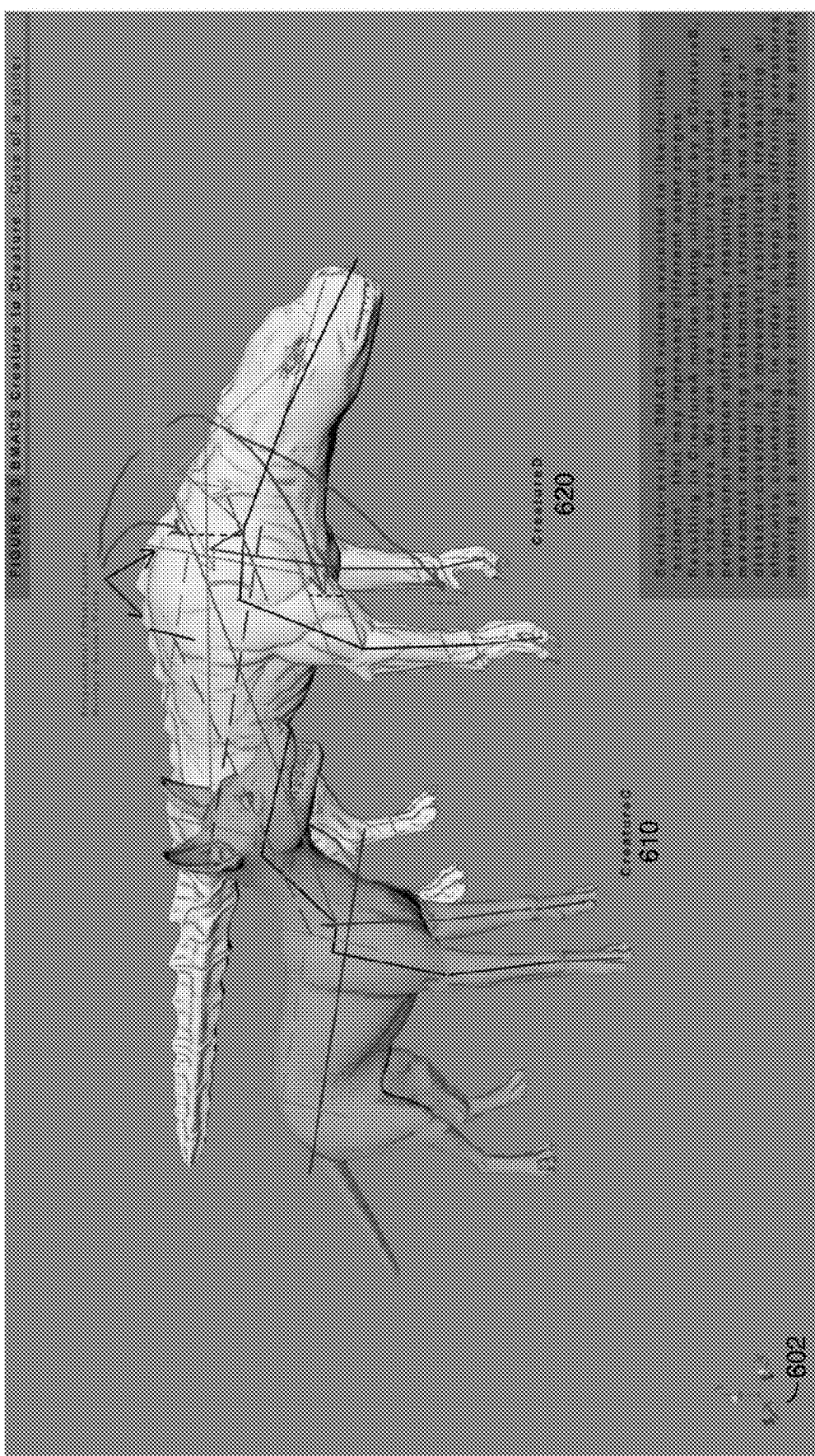
FIG. 6 illustrates an example of how a motion animation can be translated from a non-human character to a different non-human character, in accordance with embodiments of the present disclosure.

FIG. 6 illustrates an example of how a motion animation can be translated from a non-human character to a different non-humanoid character. More specifically, Creature C 610 is shown alongside a Creature D 620. A three-dimensional reference axes 602 is also shown in the lower left hand corner and the following description is written with the reference axes 602 in mind.

FIG. 6 is meant to show a particular example of how motion data can be translated between quadruped-to-quadruped or 'like'-creatures. In order to translate motion data between the two creatures, the angular base-pose differences between the two creatures can be observed and an offset value can be applied to the normalized values of the motion data, in order to account for the differences in scale, proportion, and anatomy between the two creatures.

For instance, in FIG. 6, scale differences between the Creature C 610 and the Creature D 620 can be observed in the length of the spine, the height from floor-to-base-of-the-neck, and the height from floor-to-wrist. There are also differences between the neck and head pose of the Creature C 610 and the Creature D 620.

The offset values used to account for these differences between the two rigs/creatures can be used in either direction (e.g., to drive the animation of one creature using the motion data for the other). For instance, motion data for Creature C 610 can be used with a set of offsets in order to drive animation of Creature D 620, or the other way around. These offsets may be part of one configuration that can be used to drive the translation of motion data in either direction.

The offset values between two rigs/creatures can be used in either direction, thus one configuration that can drive either of these creatures, from the other. It should be noted that, for translation of motion between similarly structured creatures (like-for-like creatures) with similar or identical anatomical features, but in subtly, or less subtly, differing proportions, such as between two quadrupeds (e.g., two canines), one would expect a more direct animation sharing in which animation translates directly between limbs and biomechanical parts. However, using this system, the result would be one creature "mimicking" the other as opposed to mechanically copying, due to the proportional differences being considered via the factorization process that translates motion in the form of actions and units of those actions, from source-to-target.

Scale factors (which may also be considered offsets) can be used to multiply and re-evaluate the action units either for individual anatomical features, or all of them at once. This would produce, for example, a larger creature using the motion of a small creature, but with foot and body positions relative to the larger creature's own size, rather than attempting to exactly match the foot and body positions of the smaller creature, which would not look pleasing nor would it appear to be the same motion in its nature. If scale factors are used to evaluate the motion data, the motion-over-distance of Creature C 610, can be matched with that of Creature D 620, respective of the weight and size of Creature D 620. For instance, the length and timing of a foot stride and foot plant will scale with the size of the creature.

Alternatively, an animator may want the footsteps to exactly match and may choose not to use a scale-factor in the evaluation of actions. This may be desirable in some instances, such as for example, if a hand/paw is interacting with an object. A foot and body position match can be performed using the same factorization in reverse to negate the difference, if needed. The smaller creature can mimic the larger creature in the same way, and this would effectively be using the reverse scale factor. Thus, the one scale-factor and understanding of the differences between creatures, is needed to use motion from either creature to the other and vice versa. It is not required to record this configuration twice/once-for-each creature.

Example of Translated Translation Between Non-Humanoid and Humanoid

Figure 7:
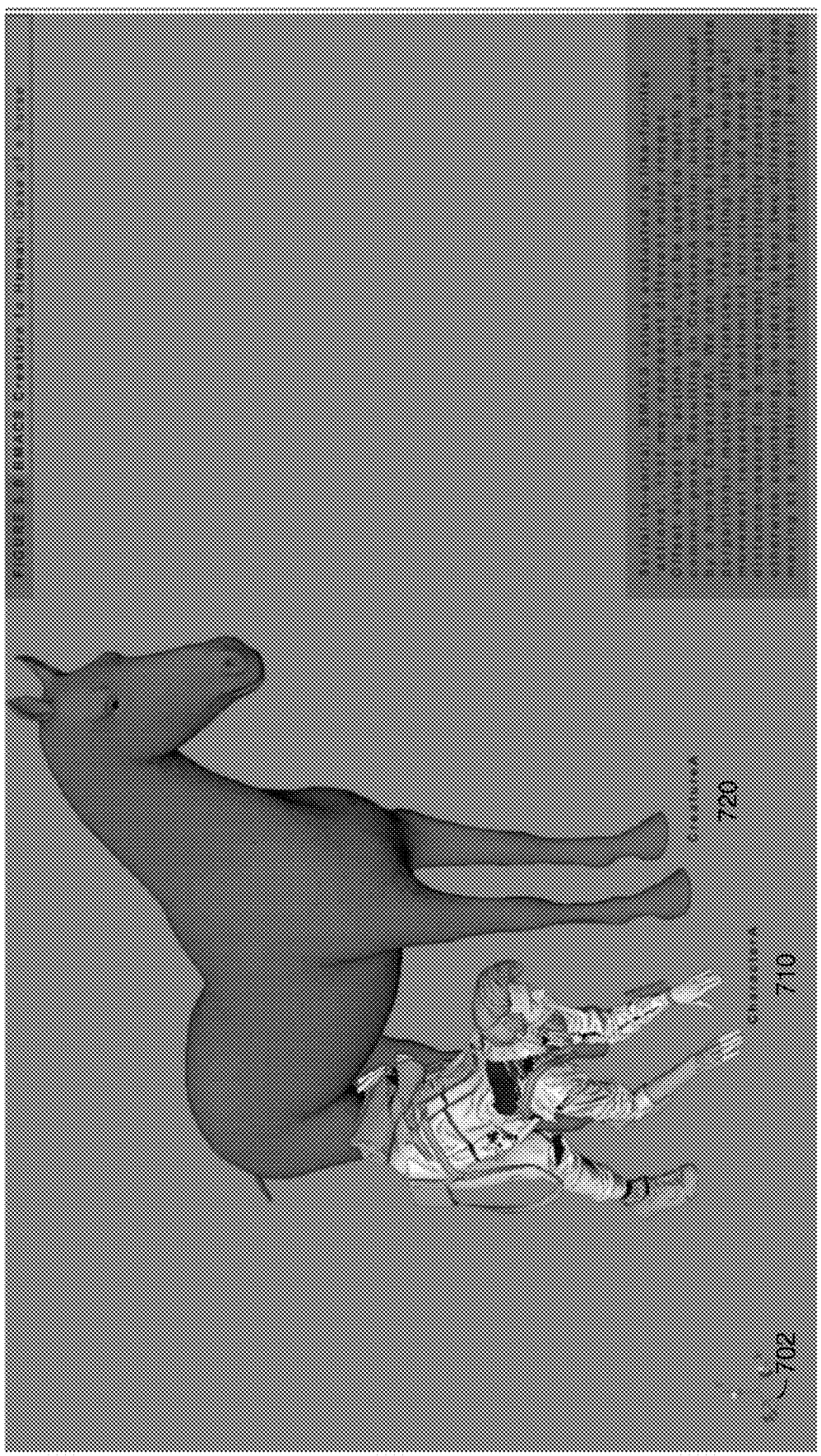
FIG. 7 illustrates an example of how a motion animation can be translated from a non-human character to a human character, in accordance with embodiments of the present disclosure.

FIG. 7 illustrates an example of how a motion animation can be translated from a non-human character to a human character. More specifically, a human Character A 710 is shown alongside a horse Character B 720. A three-dimensional reference axes 702 is also shown in the lower left hand corner and the following description is written with the reference axes 702 in mind.

The human Character A 710 may mimic the motion of the horse Character B 720. Offset values may be applied to the motion data for the horse Character B 720, to position and pose the human rig in a manner that would enable the motion of the horse Character B 720 to drive the motion of the human Character A 710, as if his fingers were hooves and his arms were the horse's front legs. The head and neck of the human Character A 710 shown in FIG. 7 also received offsets in order to match the eye-line and head trajectory.

Anatomically, a human is bound by its differences to the horse. Thus, even though movement of the horse can be described and inherited through the use of action codes, the translated movement performed by the human does not perfectly match the movement of the horse. It only resembles the movement of the horse. This may be attributed to the human pelvis being elevated due to the leg offsets and the tip-toe pose being prioritized to closer match the pose of the horse's legs, ready to enact motion. Scale factors can be used as a layer of offset values to the motion data, in order to closer match the weight and feel of the human's mimicked animation to that of the horse, with respect to the obvious size and mass differences. If the scale factors are not used, the human motion is not likely to resemble the motion of the horse very well, as a result of arm and leg movement being hyper-extended to match the foot-planting of the horse's hooves.

Process for Determining Action Codes for Animations

Figure 8:
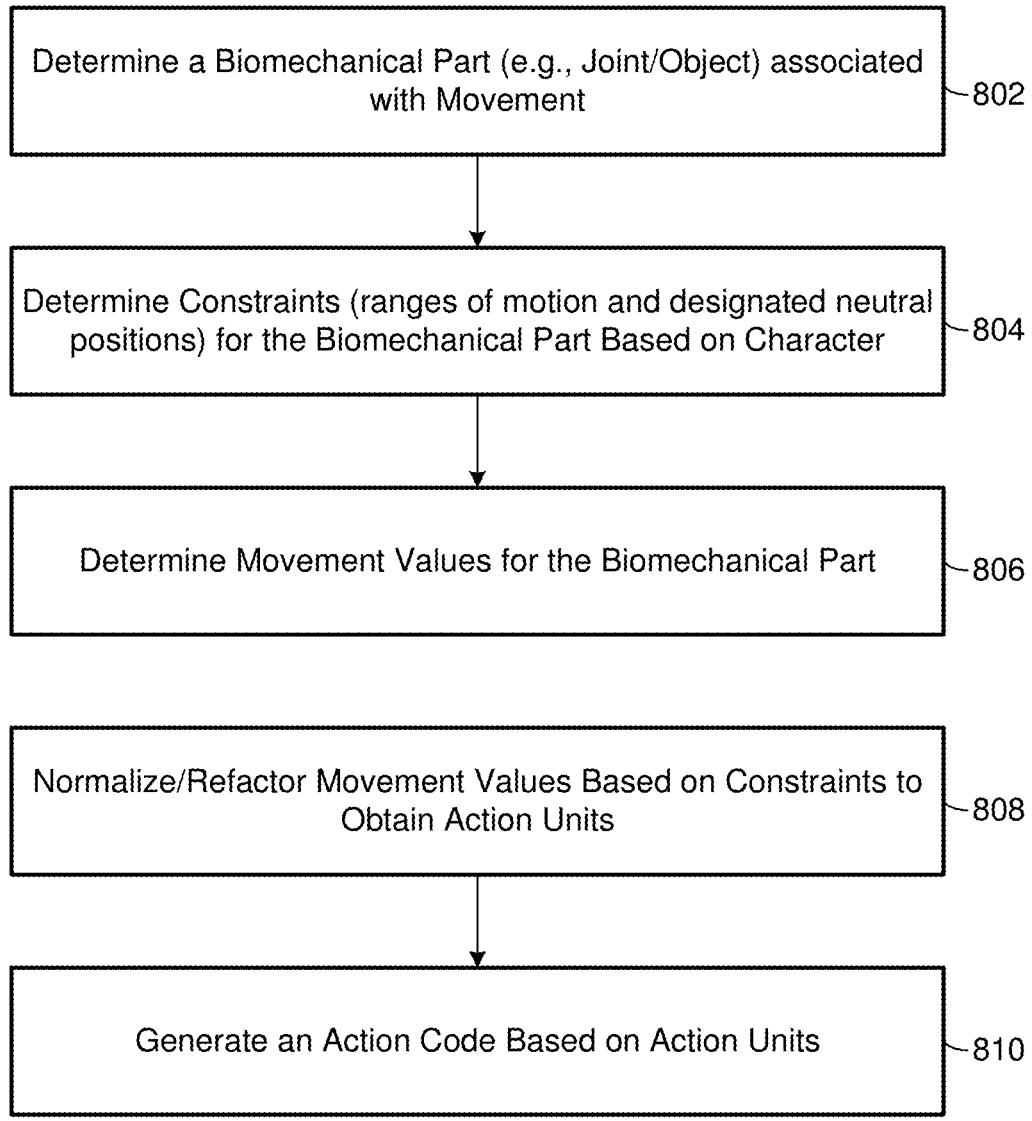
FIG. 8 is a flowchart that illustrates how an action code usable for motion translation may be determined, such as by a universal biomechanical expression system.

FIG. 8 is a flowchart that illustrates how an action code usable for motion translation may be determined, such as by a universal biomechanical expression system.

It should be noted that FIG. 8 describes a process of generating an action code for a singular biomechanical part. Animation may be complex and involve the movement of numerous biomechanical parts, which may require the generation of multiple action codes—one for each biomechanical part. That would require performing this process multiple times. Longer animation may also involve sequences of movement and actions, comparable to frames in a video with each frame having a different pose (e.g., full-body pose). Thus, longer animations may require this process to be performed repeatedly for not only the different biomechanical parts, but also across the different poses.

At block 802, the universal biomechanical expression system may determine a biomechanical part associated with movement (e.g., from motion data). Any suitable source for the motion data may be used. For instance, the right shoulder joint of a human character model may be rotated upwards in the Z-axis of rotation in order to raise the right arm of that human character model. This may be performed manually (e.g., an animator manipulates the human character model) or motion captured from a human actor. The universal biomechanical expression system may look up an action serial or serial number associated with that biomechanical part, such as by referencing a database. For example, the serial number could be a three digit number that is arbitrary assigned to analogous biomechanical parts that are common across different characters and/or creatures. For instance, many different creatures have a right shoulder joint and the right shoulder joint for all of them may be associated with the same serial number of 003.

At block 804, the universal biomechanical expression system may determine constraints that are defined for the character for that biomechanical part, such as range(s) of motion and designated neutral position(s). This may be done by referencing a table or database. For example, there may be a table associated with a particular human character that lists all the range(s) of motion and designated neutral position(s) for all the biomechanical parts in that character's anatomy. For each character, any particular biomechanical part may be associated with multiple ranges of motion and designated neutral positions. There may be a defined range of motion and designated neutral position for each of the six axes of freedom (e.g., rotate X, rotate Y, rotate Z, translate X, translate Y, translate Z). As an example, the universal biomechanical expression system may determine that the right shoulder joint for the specific human character has a full range of rotation around the Z-axis of 220 degrees with a designated neutral position in the middle of that range of rotation.

At block 806, the universal biomechanical expression system may determine movement values associated with the biomechanical part, in all six axes of freedom (e.g., rotate X, rotate Y, rotate Z, translate X, translate Y, translate Z). These movement values may be in absolute terms. For example, rotational movement may be in Euler units or degrees. In some cases, the movement values may include the stop positions of the biomechanical part after the movement occurs. In some cases, the movement values may describe the change in position of the biomechanical part (e.g., a +45 degree rotation).

At block 808, the universal biomechanical expression system may normalize and/or refactor the movement values based on the constraints (e.g., ranges of motion and designated neutral positions) in order to obtain action units. For example, the right shoulder joint of the character may have a full range of rotation around the Z-axis of 220 degrees with a designated neutral position in the middle of that range of rotation. A normalization scheme can be applied that involves values from −10 to 10, with 10 corresponding to the position at the specific maximum of the range of motion, −10 corresponding to the position at the specific minimum of the range of motion, and 0 corresponding to the designated neutral position. Thus, if the character model had moved lifted their right arm as high as possible, the determined movement value from block 806 and the designated neutral position can be used to determine the rotational position that the right shoulder joint is at, and that rotational position relative to the full range of motion can be used to calculate a normalized value within the normalization scheme (e.g., an action unit). In this case, the rotational position of the right shoulder joint in the Z-axis would be at the very maximum of the full range of rotation (e.g., +110 degrees), which would come out a normalized value of +10. Although in this example, the right shoulder joint has only been rotated in the Z-axis, this normalization can be performed for movement in each of the six axes of freedom.

At block 810, the universal biomechanical expression system may generate an action code based on the obtained action units. For instance, as described in regards to FIG. 3, an action code can be used to represent relative positioning of the referenced biomechanical part within the character's range-of-motion for each of the six axes of freedom. The universal biomechanical expression system may generate this action code based on an established standard or protocol. For instance, if the action code is to include corresponding action units for each of the three rotational axes and three translation axes, in the form xyz (e.g., [rotateX, rotateY, rotateZ, translateX, translateY, translateZ]), then the action code that involves only a rotation in the Z-axis to the maximum of the full range of rotation will look like "000010000000". Furthermore, as described in regards to FIG. 3, the action code may be included with the serial number referencing the biomechanical part in order to obtain a unified action code.

Process for Translating Motion Using Action Codes

Figure 9:
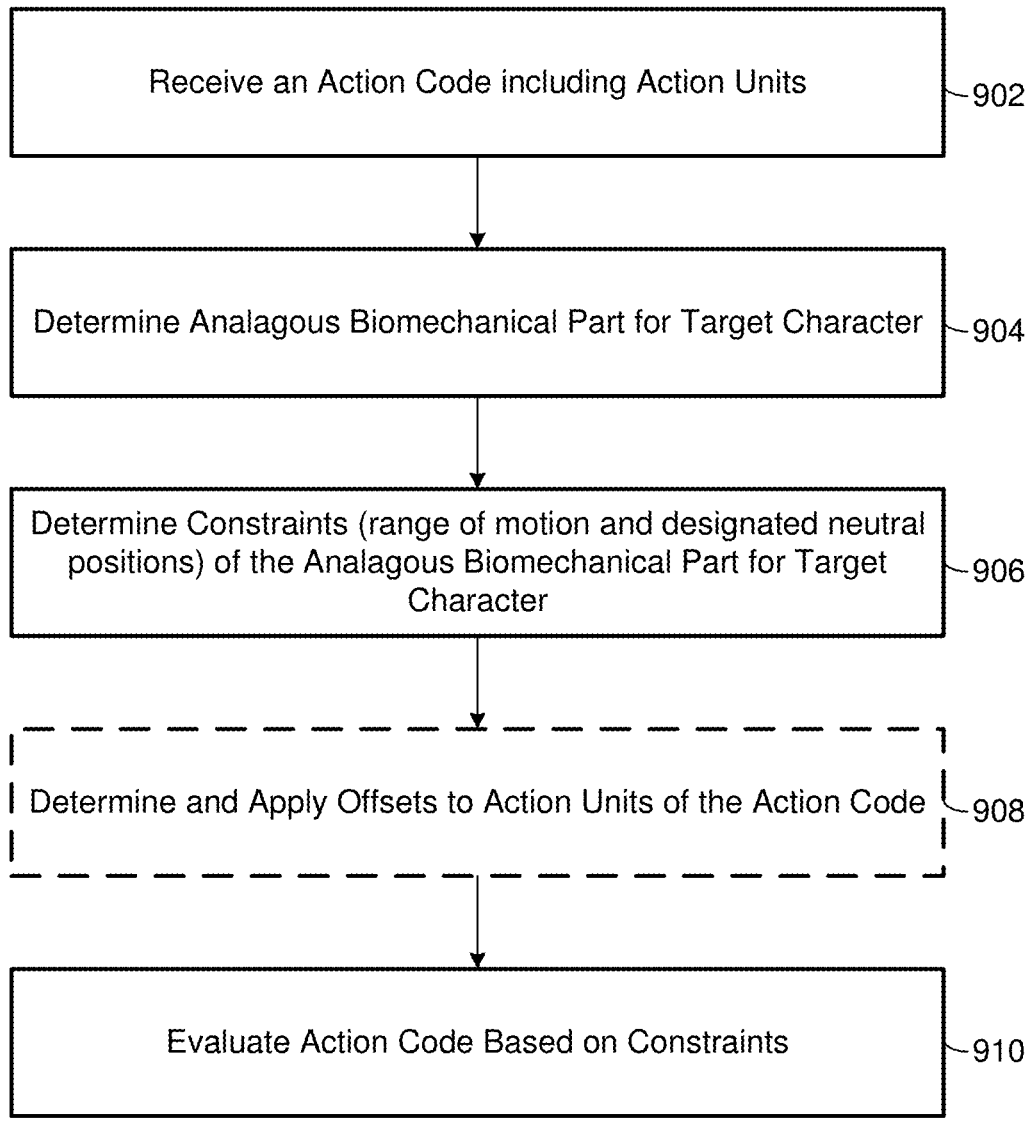
FIG. 9 is a flowchart that illustrates how an action code may be interpreted and used to translate motion, such as by a universal biomechanical expression system.

FIG. 9 is a flowchart that illustrates how an action code may be interpreted and used to translate motion, such as by a universal biomechanical expression system.

At block 902, the universal biomechanical expression system may receive an action code including action units, such as via the process described in regards to FIG. 8. In some cases, the action code may be part of a unified action code, which will also include information (e.g., an action serial or serial number) that references a particular biomechanical part associated with the movement. The action units will describe relative positioning of the referenced biomechanical part within a range-of-motion for each of the six axes of freedom. For instance, within the context of the example provided in FIG. 4, the universal biomechanical expression system may receive an action code based on a right shoulder joint rotation in the Z-axis for a human character.

At block 904, the universal biomechanical expression system may determine an analogous biomechanical part for the target character, whose motion is to be driven based on the received action code. This can be determined in a number of ways. For instance, the anatomy of the target character may be similar to the anatomy of the source character used to generate the action code, in which case the analogous biomechanical part may be easily identified and determined (e.g., based on the serial number provided in a unified action code). For example, if the unified action code specifies "003" for a right shoulder joint, then the analogous biomechanical part for the target character may be the right shoulder joint, which also should be associated with the serial number of "003." However, this may not always be the case, since the anatomies of different creatures may differ or a different mapping between biomechanical parts may be preferred.

In some cases, the universal biomechanical expression system may need to be supplied information regarding the source character, as there may be a relationship table, database, or configuration (e.g., file) which provides a mapping of biomechanical parts between two different characters or creatures for the purposes of motion translation. For instance, in the example provided in FIG. 4, in which motion is being translated from a human to a badger, the relationship table or database may define how human biomechanical parts map to badger biomechanical parts. If, upon consulting this reference, the universal biomechanical expression system determines that the right shoulder joint ("003") in a human maps to the right shoulder joint ("003") of a badger, then the right shoulder joint of the badger may be selected as the analogous biomechanical part. In some cases, the mapping may be very granular and describe how each particular axes of freedom of a biomechanical part in a first character corresponds to an axes of freedom of the analogous biomechanical part in the second character. In some cases, the relationship table, database, or configuration may not only include the mapping of biomechanical parts between two characters, but also includes any offsets that need to be applied at block 908.

At block 906, the universal biomechanical expression system may determine constraints that are defined for the target character for the analagous biomechanical part, such as range(s) of motion and designated neutral position(s). This may be done by referencing a table or database. This table or database may be separate from the relationship table or database. For example, there may be a table associated with the badger character that lists all the range(s) of motion and designated neutral position(s) for all the biomechanical parts in that character's anatomy. Each biomechanical part may be associated with multiple ranges of motion and designated neutral positions, as there may be a defined range of motion and designated neutral position for each of the six axes of freedom (e.g., rotate X, rotate Y, rotate Z, translate X, translate Y, translate Z). For instance, within the context of the example provided in FIG. 4, the universal biomechanical expression system may determine that a badger character has a limited full range of rotation for the right shoulder joint in the Z-axis.

At block 908, the universal biomechanical expression system may optionally determine and apply offsets to the action units of the action code. The offset values or multipliers to the action unit input values (e.g., the normalized values for rotational or translational position) are used to represent the anatomical differences between one creature and another. The offset values may exist to affect both positions of target joints and rotations. These offset values may be used to enable the target character to mimic the movement of the source character. In some cases, all the offsets for translating motion between a source creature/ character and a target creature/character may be recorded (e.g., in the relationship table, database, or configuration). For instance, there may be a configuration associated with translating motion between a human and a badger that includes all the offsets. The universal biomechanical expression system may consult this configuration and determine the offsets to be applied for rotations of the right shoulder joint in the Z-axis and apply them to the action units of the action code.

At block 910, the universal biomechanical expression system may interpret the action units (with any applied offsets) based on the determined constraints of the target character (at block 906). For instance, continuing within the context of the example provided in FIG. 4, if the action units are primarily associated with a right shoulder joint rotation in the Z-axis, then the universal biomechanical expression system would interpret the action units against the range of rotation for the right shoulder joint of a badger. Movement of the badger character model can then be driven by rotating the right shoulder joint of the badger model.

Process for Translating Animations Between Characters

Figure 10:
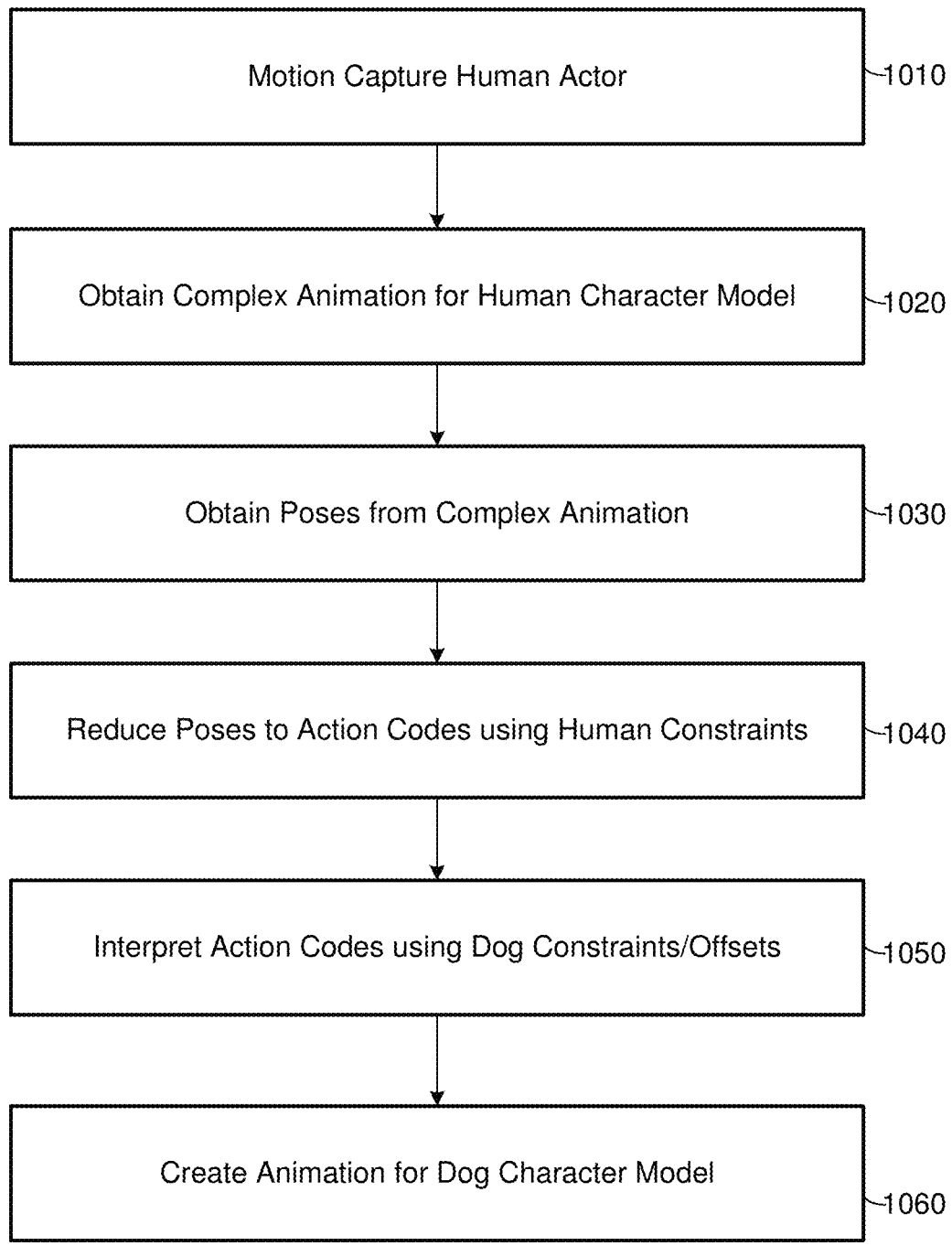
FIG. 10 is flowchart that illustrates an overview of an example of translating complex animation between characters, such as by a universal biomechanical expression system.

FIG. 10 is flowchart that illustrates an overview of an example of translating complex animation between characters, such as by a universal biomechanical expression system. More specifically, the flowchart illustrates how the motion data associated with complex animation for a human character can be applied to a dog character.

At block 1010, the movements of a human actor can be obtained via motion capture to create a complex animation. Alternatively, an animator can create a complex animation by manipulating a human character model. However, motion capture may be faster to do than animating by hand.

At block 1020, the universal biomechanical expression system may use known motion capture techniques in order to convert the motion capture data into a complex animation for a corresponding human character model. The human character may have predefined constraints (e.g., ranges of motion and designated neutral poses), or those constraints can be defined here.

At block 1030, the universal biomechanical expression system may obtain poses (e.g., motion data) from the complex animation. Longer, complex animation involves sequences of movement and actions, but can be broken down into a series of different poses (e.g., full-body pose) that are comparable to frames in a video, with each frame being a different full-body pose. These full-body poses can be sampled from the complex animation and for each full-body pose, the positioning of each biomechanical part in the character model can be determined and recorded. Thus, each full-body pose (e.g., frame in the animation) can be represented based on a collection of biomechanical part positions, which can be converted into a collection of action codes. Thus, a complex animation can be thought of as a sequence of different collections of action codes.

At block 1040, the universal biomechanical expression system may reduce each full-body pose from the complex animation into to a collection of action codes using the process described in FIG. 8, which is performed for every biomechanical part in the pose that is associated with movement. This is done by normalizing the positioning of the biomechanical parts in each full-body pose against the constraints (e.g., ranges of motion, designated neutral position, and so forth) that are defined for the human character.

At block 1050, the universal biomechanical expression system may interpret the action codes using dog constraints/ offsets, based on the process described in FIG. 9. Again, the complex animation is represented by a sequence of different collections of action codes, with a collection of action codes defining the movement for all the biomechanical parts in a full-body pose. Each action code is interpreted using the constraints of the dog character after any appropriate offsets have been applied, in order to determine the appropriate positioning of the corresponding biomechanical part within the context of the dog character model.

At block 1060, the universal biomechanical expression system may create an animation for the dog character model by applying the collections of action codes, in sequence, to the dog character model. Each collection of action codes, which is associated with a full-body pose, may result in a corresponding full-body pose for the dog character model. These full-body poses can be stitched together to create an animation and interpolation can be used to smooth out the animation.

Example Hardware Configuration of Computing System

Figure 11:
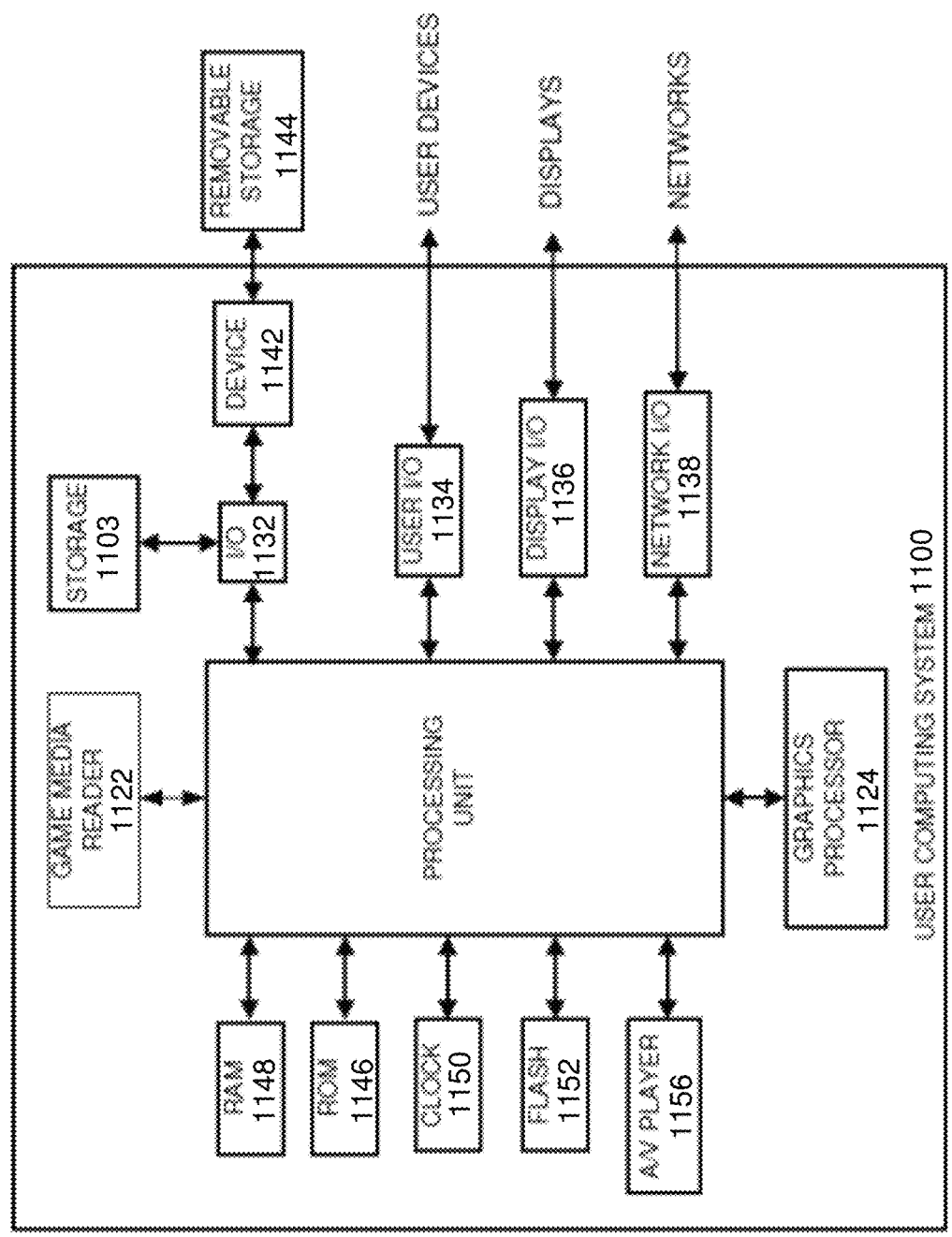
FIG. 11 is a block diagram of an example computing system.

FIG. 11 illustrates an embodiment of a hardware configuration for a computing system 1100 (e.g., user device 130 and/or universal biomechanical expression system 100 of FIG. 1). Other variations of the computing system 1100 may be substituted for the examples explicitly presented herein, such as removing or adding components to the computing system 1100. The computing system 1100 may include a computer, a server, a smart phone, a tablet, a personal computer, a desktop, a laptop, a smart television, and the like.

As shown, the computing system 1100 includes a processing unit 1102 that interacts with other components of the computing system 1100 and also components external to the computing system 1100. A game media reader 1122 may be included that can communicate with game media. Game media reader 1122 may be an optical disc reader capable of reading optical discs, such as CD-ROM or DVDs, or any other type of reader that can receive and read data from game media. In some embodiments, the game media reader 1122 may be optional or omitted. For example, game content or applications may be accessed over a network via the network I/O 1138 rendering the game media reader 1122 and/or the game media optional.

The computing system 1100 may include a separate graphics processor 1124. In some cases, the graphics processor 1124 may be built into the processing unit 1102, such as with an APU. In some such cases, the graphics processor 1124 may share Random Access Memory (RAM) with the processing unit 1102. Alternatively, or in addition, the computing system 1100 may include a discrete graphics processor 1124 that is separate from the processing unit 1102. In some such cases, the graphics processor 1124 may have separate RAM from the processing unit 1102. Further, in some cases, the graphics processor 1124 may work in conjunction with one or more additional graphics processors and/or with an embedded or non-discrete graphics processing unit, which may be embedded into a motherboard and which is sometimes referred to as an on-board graphics chip or device.

The computing system 1100 also includes various components for enabling input/output, such as an I/O 1132, a user interface I/O 1134, a display I/O 1136, and a network I/O 1138. As previously described, the input/output components may, in some cases, including touch-enabled devices. The I/O 1132 interacts with storage element 1103 and, through a device 1142, removable storage media 1144 in order to provide storage for the computing system 1100. The storage element 1103 can store a database that includes the failure signatures, clusters, families, and groups of families.

Processing unit 1102 can communicate through I/O 1132 to store data, such as game state data and any shared data files. In addition to storage 1103 and removable storage media 1144, the computing system 1100 is also shown including ROM (Read-Only Memory) 1146 and RAM 1148. RAM 1148 may be used for data that is accessed frequently, such as when a game is being played, or for all data that is accessed by the processing unit 1102 and/or the graphics processor 1124.

User I/O 1134 is used to send and receive commands between processing unit 1102 and user devices, such as game controllers. In some embodiments, the user I/O 1134 can include touchscreen inputs. As previously described, the touchscreen can be a capacitive touchscreen, a resistive touchscreen, or other type of touchscreen technology that is configured to receive user input through tactile inputs from the user. Display I/O 1136 provides input/output functions that are used to display images from the game being played. Network I/O 1138 is used for input/output functions for a network. Network I/O 1138 may be used during execution of a game, such as when a game is being played online or being accessed online.

Display output signals may be produced by the display I/O 1136 and can include signals for displaying visual content produced by the computing system 1100 on a display device, such as graphics, user interfaces, video, and/or other visual content. The computing system 1100 may comprise one or more integrated displays configured to receive display output signals produced by the display I/O 1136, which may be output for display to a user. According to some embodiments, display output signals produced by the display I/O 1136 may also be output to one or more display devices external to the computing system 1100.

The computing system 1100 can also include other features that may be used with a game, such as a clock 1150, flash memory 1152, and other components. An audio/video player 1156 might also be used to play a video sequence, such as a movie. It should be understood that other components may be provided in the computing system 1100 and that a person skilled in the art will appreciate other variations of the computing system 1100.

Program code can be stored in ROM 1146, RAM 1148, or storage 1103 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 1103, and/or on removable media such as game media 1112 (which can be a CD-ROM, cartridge, memory chip or the like, or obtained over a network or other electronic channel as needed). In general, program code can be found embodied in a tangible non-transitory signal-bearing medium.

Random access memory (RAM) 1148 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 1148 is volatile storage and data stored within RAM 1148 may be lost when the computing system 1100 is turned off or loses power.

As computing system 1100 reads game media 1112 and provides a game, information may be read from game media 1112 and stored in a memory device, such as RAM 1148. Additionally, data from storage 1103, ROM 1146, servers accessed via a network (not shown), or removable storage media 46 may be read and loaded into RAM 1148. Although data is described as being found in RAM 1148, it will be understood that data does not have to be stored in RAM 1148 and may be stored in other memory accessible to processing unit 1102 or distributed among several media, such as game media 1112 and storage 1103.

It is to be understood that not necessarily all objects or advantages may be achieved in accordance with any particular embodiment described herein. Thus, for example, those skilled in the art will recognize that certain embodiments may be configured to operate in a manner that achieves, increases, or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and the like, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
obtaining motion data for a source character;
determining, from the motion data, motion of a source biomechanical part of the source character;
determining one or more constraints for the source biomechanical part, including a first range of motion defined for the source biomechanical part and the source character;
generating, based on the one or more constraints for the source biomechanical part, an action code representative of the motion of the source biomechanical part;
determining, for a target character, a target biomechanical part that corresponds to the source biomechanical part;
determining one or more constraints for the target biomechanical part, including a second range of motion defined for the target biomechanical part and the target character;
evaluating, based on the one or more constraints for the target biomechanical part, the action code to determine relative motion of the target biomechanical part; and
applying the relative motion of the target biomechanical part to a three-dimensional model of the target character.

2. The method of claim 1, further comprising:
determining one or more offsets associated with the source character and the target character; and
prior to evaluating the action code, applying the one or more offsets to the action code.

3. The method of claim 2, wherein the one or more offsets associated with the source character and the target character are stored in a configuration associated with motion translation between the source character and the target character.

4. The method of claim 1, wherein the motion of the source biomechanical part includes at least one of: a rotation around the X-axis, a rotation around the Y-axis, a rotation around the Z-axis, a translation in the X-axis, a translation in the Y-axis, and a translation in the Z-axis.

5. The method of claim 1, wherein the first range of motion defined for the source biomechanical part and the source character is a range for one of: a rotation around the X-axis, a rotation around the Y-axis, or a rotation around the Z-axis.

6. The method of claim 1, wherein the second range of motion defined for the target biomechanical part and the target character is a range for one of: a rotation around the X-axis, a rotation around the Y-axis, or a rotation around the Z-axis.

7. The method of claim 1, wherein the action code includes a serial identifying the source biomechanical part.

8. The method of claim 1, wherein the action code represents the motion of the source biomechanical part for each of: a rotation around the X-axis, a rotation around the Y-axis, a rotation around the Z-axis, a translation in the X-axis, a translation in the Y-axis, and a translation in the Z-axis.

9. The method of claim 1, wherein generating the action code comprises normalizing the motion of the source biomechanical part using the one or more constraints for the source biomechanical part and a normalization scheme.

10. The method of claim 9, wherein the normalization scheme includes a range of values between −10 and 10.

11. Non-transitory computer storage media storing instructions that when executed by a system of one or more computers, cause the one or more computers to perform operations comprising:
obtaining motion data for a source character;
determining, from the motion data, motion of a source biomechanical part of the source character;
determining one or more constraints for the source biomechanical part, including a first range of motion defined for the source biomechanical part and the source character;
generating, based on the one or more constraints for the source biomechanical part, an action code representative of the motion of the source biomechanical part;
determining, for a target character, a target biomechanical part that corresponds to the source biomechanical part;
determining one or more constraints for the target biomechanical part, including a second range of motion defined for the target biomechanical part and the target character;
evaluating, based on the one or more constraints for the target biomechanical part, the action code to determine relative motion of the target biomechanical part; and applying the relative motion of the target biomechanical part to a three-dimensional model of the target character.

12. The computer storage media of claim 11, wherein the instructions further cause the one or more computers to perform operations comprising:
   determining one or more offsets associated with the source character and the target character; and
   prior to evaluating the action code, applying the one or more offsets to the action code.

13. The computer storage media of claim 12, wherein the one or more offsets associated with the source character and the target character are stored in a configuration associated with motion translation between the source character and the target character.

14. The computer storage media of claim 11, wherein the motion of the source biomechanical part includes at least one of: a rotation around the X-axis, a rotation around the Y-axis, a rotation around the Z-axis, a translation in the X-axis, a translation in the Y-axis, and a translation in the Z-axis.

15. The computer storage media of claim 11, wherein the first range of motion defined for the source biomechanical part and the source character is a range for one of: a rotation around the X-axis, a rotation around the Y-axis, or a rotation around the Z-axis.

16. The computer storage media of claim 11, wherein the second range of motion defined for the target biomechanical part and the target character is a range for one of: a rotation around the X-axis, a rotation around the Y-axis, or a rotation around the Z-axis.

17. The computer storage media of claim 11, wherein the action code includes a serial identifying the source biomechanical part.

18. The computer storage media of claim 11, wherein the action code represents the motion of the source biomechanical part for each of: a rotation around the X-axis, a rotation around the Y-axis, a rotation around the Z-axis, a translation in the X-axis, a translation in the Y-axis, and a translation in the Z-axis.

19. The computer storage media of claim 11, wherein generating the action code comprises normalizing the motion of the source biomechanical part using the one or more constraints for the source biomechanical part and a normalization scheme.

20. A system comprising one or more computers and computer storage media storing instructions that when executed by the one or more computers, cause the one or more computers to perform operations comprising:
   obtaining motion data for a source character;
   determining, from the motion data, motion of a source biomechanical part of the source character;
   determining one or more constraints for the source biomechanical part, including a first range of motion defined for the source biomechanical part and the source character;
   generating, based on the one or more constraints for the source biomechanical part, an action code representative of the motion of the source biomechanical part;
   determining, for a target character, a target biomechanical part that corresponds to the source biomechanical part;
   determining one or more constraints for the target biomechanical part, including a second range of motion defined for the target biomechanical part and the target character;
   evaluating, based on the one or more constraints for the target biomechanical part, the action code to determine relative motion of the target biomechanical part; and
   applying the relative motion of the target biomechanical part to a three-dimensional model of the target character.

* * * * *